United States Patent [19]

Kobayashi

[11] Patent Number: 4,680,748
[45] Date of Patent: Jul. 14, 1987

[54] RECORDED DISK PLAYBACK APPARATUS

[75] Inventor: Kōichi Kobayashi, Yokohama, Japan

[73] Assignee: Kabushiki Kaisha Toshiba, Kawasaki, Japan

[21] Appl. No.: 763,958

[22] Filed: Aug. 9, 1985

[30] Foreign Application Priority Data

Dec. 19, 1984 [JP] Japan ................ 59-266331
Dec. 27, 1984 [JP] Japan ................ 59-273629
Jun. 20, 1985 [JP] Japan ................ 60-132914

[51] Int. Cl.⁴ .................. G11B 19/10; G11B 1/00; G11B 17/04
[52] U.S. Cl. .................. 369/77.1; 369/75.2; 369/264; 369/271
[58] Field of Search .......... 369/75.2, 77.1, 77.2, 369/263, 264, 271

[56] References Cited

U.S. PATENT DOCUMENTS

| | | | |
|---|---|---|---|
| 3,467,393 | 9/1969 | Kuwayama | 369/264 |
| 4,410,971 | 10/1983 | Eisemann | 369/75.2 |
| 4,439,851 | 3/1984 | Kiguchi | 369/77.2 |
| 4,481,618 | 11/1984 | Nayama | 369/75.2 |
| 4,507,768 | 3/1985 | Ikedo et al. | 369/263 |
| 4,539,671 | 9/1985 | Higashihara | 369/75.1 |
| 4,561,085 | 12/1985 | Funabashi | 369/77.1 |
| 4,592,039 | 5/1986 | Toyoguchi et al. | 369/75.2 |

FOREIGN PATENT DOCUMENTS

| | | | |
|---|---|---|---|
| 56-58167 | 5/1981 | Japan | 369/75.2 |
| 58-60460 | 4/1983 | Japan | 369/77.1 |
| 59-139186 | 8/1984 | Japan | 369/77.1 |
| 59-221867 | 12/1984 | Japan | |

*Primary Examiner*—Steven L. Stephan
*Attorney, Agent, or Firm*—Schwartz, Jeffery, Schwaab, Mack, Blumenthal & Evans

[57] ABSTRACT

A recorded disk playback apparatus in accordance with the present invention includes a sub-chassis whose one end is supported as turnable with the main chassis that is housed in the main frame, carriage which is freely movable on the sub-chassis to feed the pick-up head in the radial direction of the recorded disk, a turn table which is placed on the sub-chassis to have the recorded disk placed on it, a slide table which transports the recorded disk to a position which coincides with the center of the rotatable turn table, a disk clamper which is fixed rotatably to the main chassis, an adjusting mechanism which moves the carriage, as well as moves the sub-chassis upward/downward, a driving motor which, by the driving of the adjusting mechanism, serves commonly for the feeding drive of the pick-up head and the turning drive of the sub-chassis, and a locking/unlocking mechanism which locks/unlocks the slide table in association with the operation of the adjusting mechanism. The engagement/disengagement of the disk clamper with respect to the recorded disk which is placed on the turn table is controlled by the raising/lowering drive of the sub-chassis.

17 Claims, 54 Drawing Figures

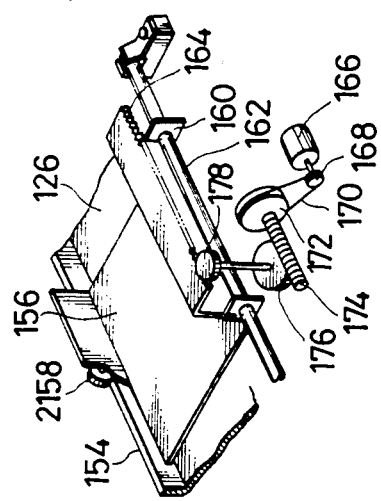
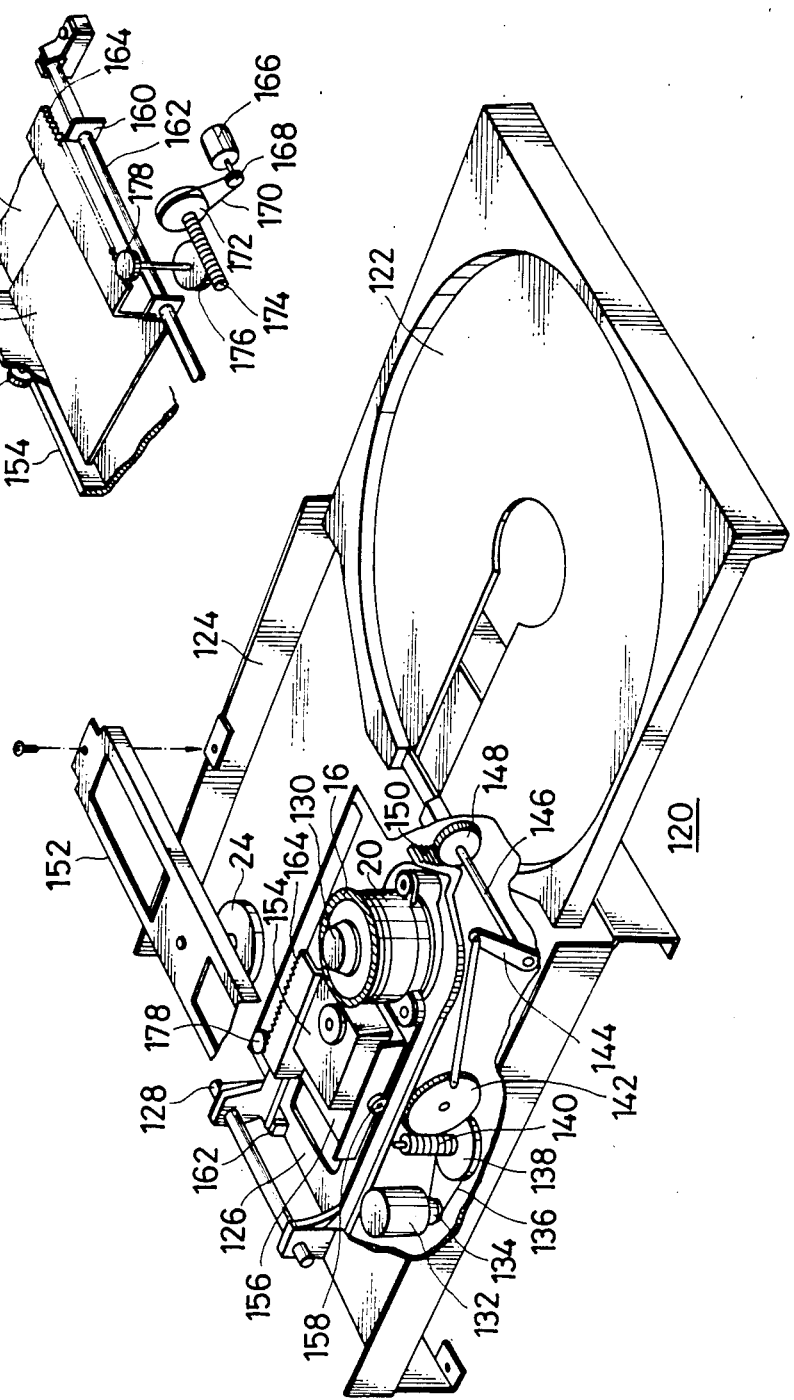

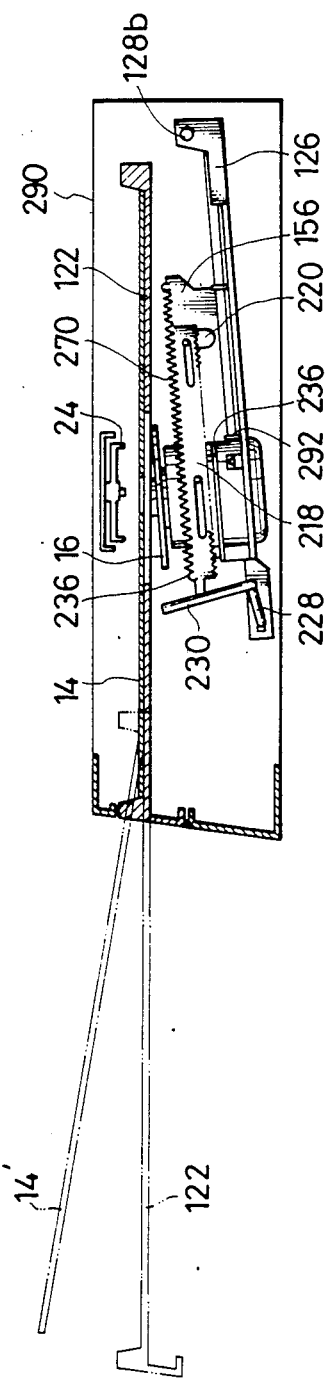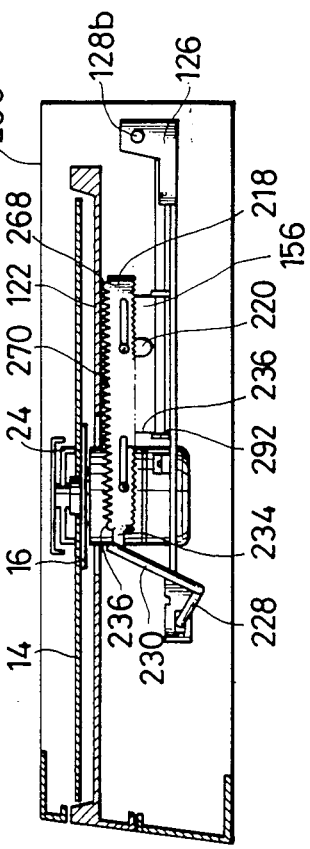

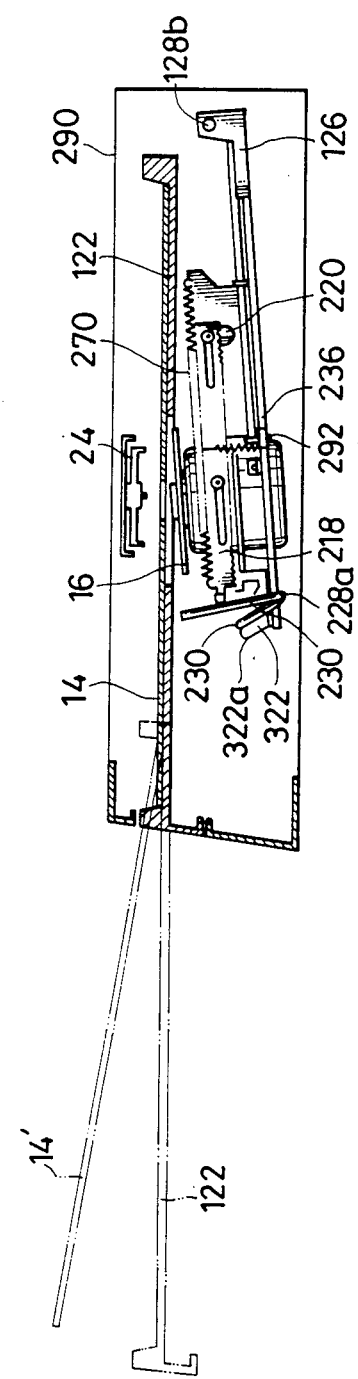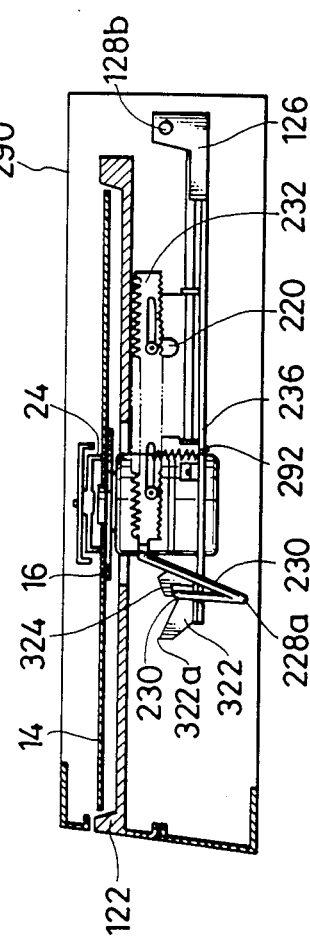
FIG.36
FIG.37

RECORDED DISK PLAYBACK APPARATUS

BACKGROUND OF THE INVENTION

1. Field of the Invention

The present invention relates to a playback apparatus, for recorded audio and video information, that utilizes laser light, in particular, to a recorded disk playback apparatus with a simplified loading mechanism which additionally reduces the number of motors and speed reduction mechanisms that are required.

2. Description of the Prior Art

Several years ago, there was introduced in the fields of audio and video an optical video disk in which the information on the recording disk (referred to as the disk hereafter) is reproduced by irradiating the disk with laser light. The signals are represented by variations in the amount of returned light due to diffraction by the pits on the disk surface. As for the playback apparatus itself, a front loading system is in wide use in which the loading/unloading of the disk is carried out from the front of the playback apparatus. This provides for easy operation and efficient utilization of space. In what follows, a description will be given of a prior art recorded disk playback apparatus for optical disks of the front loading type by referring to FIGS. 1 through 9.

In FIG. 2 is illustrated the configuration in which the slide table 10 for taking in and out the disk has been pulled out of the main frame 12 of the playback apparatus, while in FIG. 1 is shown the configuration in which the slide table 10 has been pushed in.

The operations of loading/unloading are illustrated in FIGS. 3 to 5.

In FIGS. 3 and 4 it is shown that the lifter 18, which acts to place the disk 14 onto the turn table 16, is installed on the slide table 10 in such a manner that it is freely movable up and down. On the turn table motor 20, the turn table 16 and the center spindle 22 for centering the disk 14 are installed so as to rotate with the turn table motor 20 as one united body.

The disk clamper 24 which moves up and down due to the turning of the support arm 28, which turns around the fulcrum 26, plays the role of clamping the disk 14 onto the turn table 16.

For loading the disk, the disk 14 is placed on the slide table 10, which is pulled out as shown by FIG. 3, and then the slide table 10 is pushed in, as shown by FIG. 4. It now becomes necessary to place the disk 14 on the turn table 16, since in this state the disk 14 is still sitting on the slide table 10. When the slide table 10 is pushed in, the lifter 18 that was supporting the disk 14 moves downward to a position which is lower than the turn table 16, leaving the disk 14 on the turn table 16. At the same time as this, the disk clamper 24, that is installed on the center stay 30, comes down to clamp the disk 14. By these actions, the disk 14 is clamped between the turn table 16 and the disk clamper 24, and the disk 14 rotates due to the rotation of the turn table motor 20.

In FIG. 5 is illustrated the condition in which the loading of the disk 14 is completed. For unloading the disk 14, it is necessary to reverse the above actions. The disk 14 that was rotating is brought to a stop. The disk clamper 24 and the lifter 18 move upward as shown by FIG. 4. The disk 14 is removed from the top of the turn table 16 to the top of the lifter 18, and the slide table 10 is pulled out as shown by FIG. 3 to allow the disk 14 to be taken out.

The mechanisms for carrying out the loading/unloading as described in the above will be illustrated in FIGS. 6 and 7.

In FIG. 6 is shown the mechanism of the loading drive motor and the construction of the disk clamper. The rotation of the loading drive motor 32 is transmitted to the pinion 44 via the belt 34, a small pulley 36, and a large pulley 38, its speed being reduced by the worm 40 and the worm wheel 42. On the rack 46 there are created long openings 48a and 48b to which are inserted in slidable fashion the posts 52a and 42b, respectively, that are installed protruding from the bottom of the chassis 50. Since the pinion 44 and the rack 46 are kept engaged between them, the rack 46 is able to move back and forth, (in the directions of the arrows in the figure) with respect to the main frame of the playback apparatus, by the rotation that is transmitted to the pinion 44. On the other hand, the disk clamper 24 moves up and down with the turning of the two arms 28a and 28b, each of which have ends supported on the sides of the chassis 50 by the pins 26a and 26b, using pins 26a and 26b as the fulcrums. On the arm 28a there is formed a sloped cam 54 which makes a direct contact with the roller 57 that is installed on the rack 46 to be freely rotatable, by means of a spring 56 which has one end attached to the arm 28b.

A U-shaped metallic fitting 58 is installed in a turntable fashion on the indentations 58a and 58b that are prepared on both sides of the chassis 50, and the branches 60a and 60b on both ends of the U-shaped fitting make contact with the rollers 62a and 62b prepared on the arms 28a and 28b, so as to have the force of the spring 56 apply equally on the two arms 28a and 28b. This helps the horizontal ascent/descent of the disk clamper 24 to be carried out correctly.

With the rotation of the motor 32 being transmitted to the pinion 44 by the above mechanism, as the rack 46 moves to the front of the main frame of the playback apparatus 12, the disk clamper 24 goes down, and as the rack 36 moves to the rear, the clamper 24 goes up.

Next, FIG. 7 shows the construction of the slide table, the lifter, and the ascent/descent cams. At the four corners of the lifter 18 there are installed cylindrical protuberances 64, and corresponding to these protuberances 64 there are formed on both inner surfaces of the slide table the guiding grooves 66 for guiding the protuberances 64 when they are moved up and down. The respective cam holes 72 in the left ascent/descent cams 68 and the right ascent/descent cam 70 engage the protuberances 64 of the lifter 18, holding the lifter 18 so it is slidable in the longitudinal direction along the inner sides of the slide table 10. The hole 76 created at the central part of the connecting rod 74 engages with the pin 78 of the slide table 10, and the pins 80a and 80b at both ends of the connecting rod 74 engage the left ascent/descent cam 68 and the right ascent/descent cam 70, respectively. On the left ascent/descent cam 68 there is prepared a post 86 for receiving the transmitted displacement motion of the rack 46 through its engagement with the protuberances 82 and 84 that are installed protrusively at the center of the rack 46.

FIGS. 8 and 9 show views from bottom of the slide table 10. In such a mechanism, when the rack 46 in FIG. 6 is shifted back and forth with respect to the main frame 12 of the playback apparatus, the left ascent/descent cam 68 is moved as shown by FIGS. 8 and 9. The displacement motion is also transmitted to the right ascent/descent cam 70 by means of the connecting rod 80. Then, it becomes possible to raise and lower the lifter 18 by maintaining the protuberances at the four corners of the lifter in simultaneous horizontal states with the help of the cam holes 72 of FIG. 7. This accomplishes the loading/unloading of the disk mentioned earlier.

However, in the prior art recorded disk playback apparatus as described in the foregoing, a motor for feeding the drive of the playback pick-up head and a speed reduction mechanism (not shown) are required separately from the motor for the loading drive 32 of the disk and the speed reduction mechanism, making it difficult to reduce the size and weight of the apparatus.

Moreover, in the prior art construction as described in the above, it is necessary to clamp the disk 14 by lowering the disk clamper 24 so that a mechanism for lifting/lowering the disk clamper 24 is required. Furthermore, it is also necessary to incorporate in the apparatus a mechanism for lifting and lowering the lifter 18, increase in the number of parts required further hindering efforts to reduce the size of the apparatus.

In addition, the slide table 10 and the lifter 18 are given separate piece constructions. Because of this, in the slide table 10 there is created an opening for letting the lifter 18 to pass through in order to lift and lower the lifter 18 with respect to the slide table 10. However, since the slide table 10 is pulled out and pushed in frequently, it has to be made strong enough so as not to be broken easily, in consideration of the situation in which an unintentional force in the up and down direction is applied to it. This leads to a weakness in that the apparatus has to be constructed by using a thick material in order to give the lifter 18 a separate piece construction and make it still strong enough not to break easily, even with a large opening in it.

Now, in FIG. 10 there is shown the prior art construction of the slide table and its locking/unlocking mechanism. In FIG. 10, the slide table 10 is shown to have a mechanism within which it is made slidable, inside the main frame 50 of the chassis, by means of the rollers and the rails (not shown).

In order to load the disk on the playback apparatus, the slide table 10 is pulled out from the front of the playback apparatus, the disk is placed on it, and then the slide table 10 is pushed in.

The slide table 10 becomes locked in this state, and the disk is placed on the turn table and is then held down by the disk clamper. The turn table then rotates, and the state in which playback is possible is reached when the rotation of the turn table attains a fixed speed of rotation. The locking plate 90 for locking the slide table 10 is supported by the pins 92a and 92b so as to be slidable in the directions represented by the arrows a and b. The locking plate 90 is energized in the direction, indicated by arrow a, by a spring 94. The unlock holding lever 96 is mounted turnably on the locking plate 90 by a pin 98. The unlock holding lever 96 is energized in the clockwise direction as seen from the top by a spring 98.

The stopper 100, which is prepared on the main frame 50 of the chassis, acts, via the unlocking lever 102, to guide the locking board 90 as it is moved to the left.

The solenoid 104 that is attached to the main frame 50 of the chassis acts as the source of the power for moving the locking board 90 in the direction of the arrow b.

On the arm 106 there are provided arm tips 106a and 106b. The tip 106a is engaged with the plunger 108 of the solenoid 104 by a pin 110. The other arm tip 106b makes direct contact with the bent portion 90a of the locking plate 90. By this arrangement, when the solenoid executes its sucking action, the locking plate 90 is moved in the direction indicated by arrow b.

The operation of the prior art mechanism as described in the above is as follows: when the locking roller 112a, of the two locking rollers 112a and 112b, of the slide table 10 starts to press the unlock holding lever 96, the unlock holding lever 96 is released from the stopper 100, the locking plate 90 slides, in the direction indicated by arrow a, under the force of the spring 94. The locking action is completed by holding down the locking rollers 112a and 112b.

To pull out the slide table 10, by operating the unloading button or the like, the solenoid 104 conducts electricity momentarily, and sucks the plunger 108.

Due to this action, the arm 106 rotates to move the locking plate 90, in the direction indicated by arrow b, and the locking rollers 90a and 90b are released.

However, in locking/unlocking mechanism according to the prior art techniques, in order to release the lock of the slide table, a solenoid with a large amount of power has to be utilized. The use of such a solenoid causes a rise in the cost, and is undesirable due to the space occupied by the solenoid from a reduction in size viewpoint. It is also disadvantageous due to the weight of the solenoid from a reduction in weight viewpoint.

SUMMARY OF THE INVENTION

Accordingly, an object of the present invention is to provide a recorded disk playback apparatus which is capable of reducing the size and weight, as well as to improve the productivity and reliability, of the apparatus by diminishing the number of motors and the speed reduction mechanisms, and by simplifying the mechanism for the loading operation.

Another object of the present invention is to provide a recorded disk playback apparatus which does away with the large opening in the slide table for allowing a lifter to pass through, by eliminating the up and down motion of the lifter through the unification of the slide table and the lifter, and also is capable of reducing the thickness of the material to be used, for the slide table because of the resultant increase in strength of the slide table due to this unification.

Still another object of the present invention is to provide a recorded disk playback apparatus which includes, separately from the main chassis, a sub-chassis that incorporates a turn table, which supports the sub-chassis at one of its ends by a combination of gears, cams, and the like, to arrange for the turn table to be inclinable, and is capable of clamping the disk between the turn table and a disk clamper which is fixed to the main chassis.

Still another object of the present invention is to provide a recorded disk playback apparatus which is equipped with a locking/unlocking mechanism that is capable of carrying out the unloading of the disk without the use of a solenoid for releasing the locking of the slide table.

The present invention disk playback apparatus of front loading type places a recorded disk on the turn table by means of a slide table and clamps the disk between a disk clamper and the turn table. The present invention includes a motor which is used commonly by the loading drive, the unloading drive, and the pick-up head feeding drive. It further includes a rack which is movable in the radial direction relative to the recording disk under the power of the motor, and protuberances that are movable in long openings. The apparatus is equipped with a carriage which is interlocked with the rack within a predetermined range of movement; a stopper for defining the range of the movement of the carriage; an interlocking mechanism which, after the movement of the carriage is regulated by the stopper, allows the carriage alone to be movable by the motor mentioned above, and after the regulation on the movement of the carriage is released by the stopper, makes it possible to interlock the rack and the carriage; and a pick-up head placed on the carriage for reading and playback the signals.

Another feature of the present invention is to provide a recorded disk playback apparatus in which a disk receiving section (the lifter) is formed in a unified body with the slide table, without lifting/lowering the lifter; the turn table, motor, pick-up head, and carriage are installed on the sub-chassis; and the sub-chassis is supported by the pins at the rear of the main chassis as turntable. This allows a mechanism in which the turn table mounted on the sub-chassis ascends/descends with respect to the main chassis by the turning of the sub-chassis. In addition, the apparatus includes a disk clamper which is mounted freely turnably on the center stay, without being lifted/lowered, and a loading mechanism of the disk which lifts the disk off the slide table by raising the turn table and clamps it between the turn table and the disk clamper.

Still another feature of the present invention is to realize a recorded disk playback apparatus in which an unlocking lever, instead of a solenoid, is used for releasing the locking of the slide table, and the locking of the slide table is arranged to be released by the locking arm being moved by the unlocking lever, just before the completion of the unloading operation of the disk. This makes it possible to do away with the solenoid, which leads to advantages of reduced cost, size, and weight of the apparatus.

These and other objects, features and advantages of the present invention will be apparent from the detailed description of the preferred embodiments with reference to the accompanying drawings.

BRIEF DESCRIPTION OF THE DRAWINGS

FIG. 11 is a perspective view of an embodiment of the loading mechanism in a recorded disk playback apparatus in accordance with the present invention.

FIG. 12 is an explanatory perspective view of the carriage section of FIG. 11.

FIGS. 25 and 26 are explanatory diagrams illustrating the loading operation due to the present invention.

FIGS. 36 and 37 are explanatory diagrams for illustrating the loading operation in accordance with the present invention.

DESCRIPTION OF THE PREFERRED EMBODIMENTS

Figure 1:
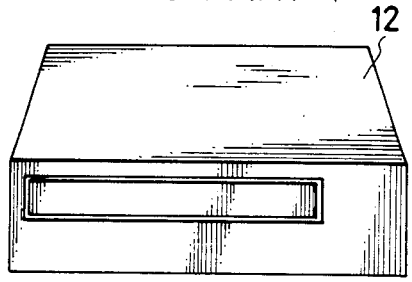
FIGS. 1 and 2 are external perspective views of a recorded disk playback apparatus according to the present invention and according to the prior art.
Figure 2:
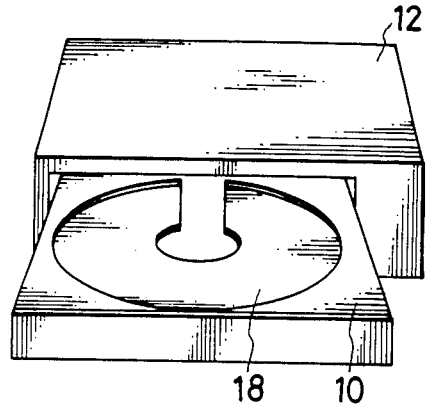
Figure 3:
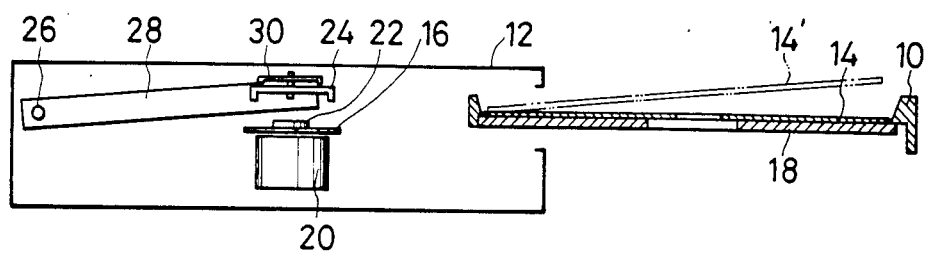
FIGS. 3 to 5 are explanatory diagrams for illustrating the loading operation of the prior art recorded disk playback apparatus.

Referring to FIGS. 11 thru 15, there is shown a recorded disk playback apparatus embodying the present invention with reference numeral 120. As shown in FIG. 11, the recorded disk playback apparatus 120 includes a slide table 122 which, differing from the prior art slide table, is formed in a united body with a lifter. Slide table 122 slides back and forth with respect to the main chassis 124, without being lifted/lowered. A sub-chassis 126 provided separately from the main chassis 124 is supported turnably in the rear of the main chassis 124 with a pin 128 as the fulcrum.

A turn table motor 20 fixed to the sub-chassis 126, a turn table 16 mounted on the upper end of the turn table motor 20, and a center spindle mounted on the turn table 16, are arranged to rotate as a unified body with their respective central axis coinciding.

A motor 132 is for moving upward/downward the sub-chassis 126, and its rotation is transmitted, via a small pulley 134 which is connected directly to the motor 132, a belt 136, and a large pulley 138, a worm gear 140, a worm wheel 142, a crank arm 144, and a pinion 146, to a pinion gear 148. The pinion gear 148 is always engaged with a rack 150 which is furnished at the front end of the sub-chassis 126 so that the sub-chassis 126 can be raised or lowered by this arrangement.

A disk clamper 24 is turnably mounted on a center stay 152, which spans both sides of and is fixed to the main chassis 124, at a position exactly above the center of the disk.

A carriage 156 which acts to move a pick-up head 154 for reading and playback recording in the radial direction of the disk, is furnished on the sub-chassis 126.

Next, in FIG. 12 there is shown in detail the part of the apparatus which guides the carriage 156 back and forth. A roller 158, which is attached rollably on one side of the carriage 156, is guided by a guiding rail 154 that is formed on the edge of the same side of the sub-chassis 126. There is formed an axle bearing 160 on the other side of the carriage 156, and a guiding rod 162, with one end fixed to the sub-chassis 126, is inserted in the axle bearing 160 to facilitate the feeding operation of the carriage.

In addition, on the carriage 156 there is provided a rack 164 for receiving the transmission of the feeding drive. The rotation of a feeding drive motor 166 is transmitted to a pinion gear 178 which is geared into the rack 164, via a small pulley 168, a belt 170, a large pulley 172, a worm gear 174, and a worm wheel 176, to execute the feeding operation.

Figure 13:
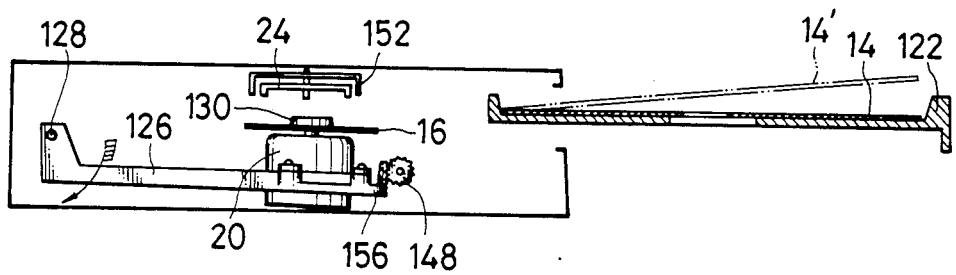
FIGS. 13 to 15 are simplified diagrams for illustrating the loading operation according to the present invention.
Figure 14:
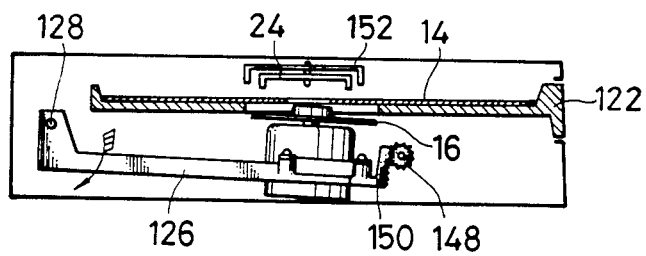

Next, the operation of a first embodiment according to the present invention will be described by referring to FIGS. 13 to 15. To load the disk 14, the disk 14 is placed on the turn table 122 in the state where the turn table is pulled out as shown by FIG. 13, then the slide table 122 is pushed in as shown in FIG. 14. In the states of FIGS. 13 and 14 in which the slide table 122 is pulled out and pushed in, the sub-chassis 126 rotates in the direction of the arrow driven by the motor 132 (see FIG. 11), and the turn table 16 is in a position where it is lowered, making it possible for the slide table 122 and the disk 14 to pass through.

Figure 15:
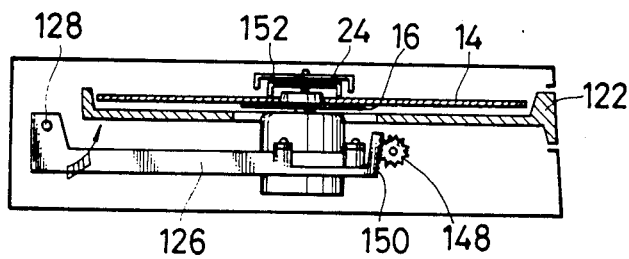

When the slide table 122 is closed, the motor 132 shown in FIG. 11 is started in order to rotate the pinion gear 148 whose rotation is transmitted to the rack 150 of the sub-chassis 126, causing the rotation of sub-chassis 126 in the direction of the arrow, with the pin 128 as the axis, as shown in FIG. 15. By this operation, the turn table 16 is raised, lifting the disk 14 off of the slide table 122 from down below, pushing the disk against the disk clamper 24, so that the disk 14 is clamped between the turn table 16 and the disk clamper 24, thus completing the loading of the disk.

In unloading the disk, the reverse operation from loading the disk is carried out. Namely, as shown in FIG. 15 to FIG. 14, turn table 16 is lowered along with the lowering of the sub-chassis 126, leaving behind the disk 14 on the slide table 122, making it possible for the slide table 122 and the disk 14 to be pulled out. Then, as shown in FIG. 13, the slide table 122 is pulled out, and the disk 14 is taken out.

As described in the above, in contrast to the prior art apparatus which requires both a mechanism for raising/lowering the lifter 18 and a mechanism for raising/lowering the disk clamper 24, it became possible to carry out disk loading with a simplified mechanism which raises/lowers the sub-chassis 126 alone. Accordingly, the present embodiment makes it possible to diminish the number of parts required, bringing about such favorable effects as a reduction in the size, weight, and cost of the apparatus and an improvement in the productivity.

Next, modifications to the embodiment of the recorded disk playback apparatus shown in FIG. 11 will be described by referring to FIGS. 16 to 19.

Figure 16:
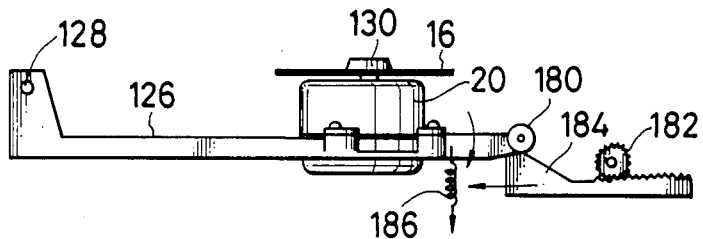
FIGS. 16 to 19 are simplified diagrams for illustrating modifications to the embodiment shown in FIG. 11.
Figure 17:
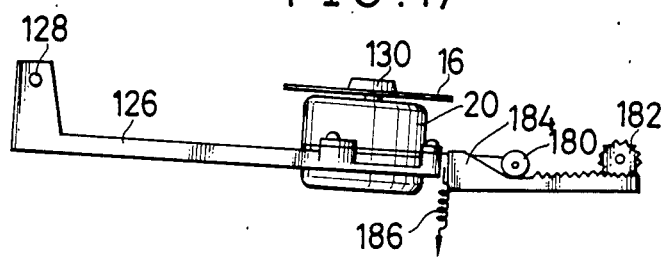

In the modifications shown in FIGS. 16 and 17, a roller 180 is provided and is freely rotatable at the front end of the sub-chassis 126. At a point making a direct contact with the roller 180, a sloped cam 184 that is engaged with a gear 182 is installed in such a manner as to be slidable back and forth with respect to the apparatus. Further, the subchassis 126 is energized downward by a spring 186. With this arrangement, when the gear 182 is rotated by a loading drive motor (figure omitted) the sloped cam 184 is slided toward the rear, the roller 180 slides down the slope of the sloped cam 184, causing the sub-chassis 126 to rotate downward with the pin 128 as the fulcrum, thus lowering the turn table 16. However, when the sloped cam 184 slides forward, the sub-chassis 126 rotates upward, raising the turn table 16, so that loading/unloading of the disk can be accomplished.

Figure 18:
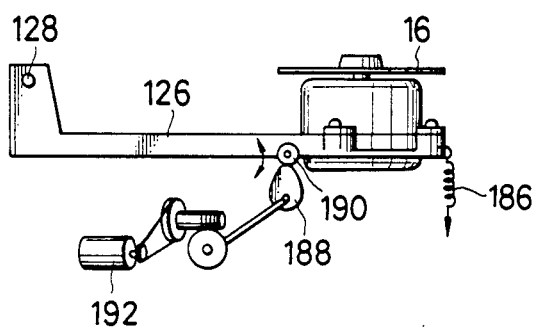

In the modification shown by FIG. 18 which makes use of an eccentric cam 188 instead of the sloped cam 184, a roller 190 installed on the subchassis 126 and is freely rotatable, is arranged to be in direct contact at all times with the eccentric cam 188. Therefore, when the roller 190 makes contact with the portion of periphery of the cam which is the farthest from the center of the cam, the sub-chassis 126 is at a position of being raised, and when, by the rotation of the eccentric cam 188, the roller 190 makes contact with the portion of the periphery of the cam which is the nearest from the center of the cam, the sub-chassis 126 finds itself in the lowered position. In this way, by rotating the eccentric cam 188 by use of a loading drive motor 192 via a speed reduction mechanism, the sub-chassis 126 is rotated to go up and down with the pin 128 as the fulcrum, and the turn table 16 is raised/lowered. In carrying out this motion, it can be made to take place smoothly if the sub-chassis 126 is energized downward by means of a spring 186. Here, an eccentric cam may be replaced by an elliptic cam, a heart-shaped cam, and so on, as long as the distance from its center to the periphery is not constant.

Figure 19:
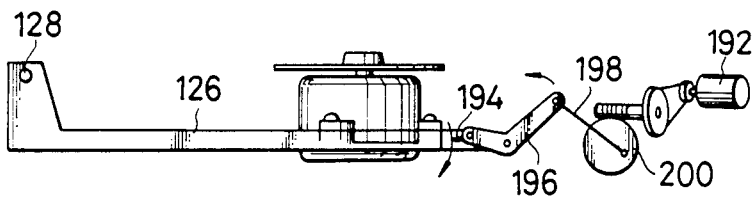

In the modification shown in FIG. 19, one end of a bent revolving lever 196 is supported by a slit 194 which is created at the front end of the sub-chassis 126, and the other end of the lever is supported by one end of a linking rod 198. When the loading drive motor 192 starts operation, a worm wheel 200 rotates via a speed reduction mechanism, and a linking rod 198, which is connected to the worm wheel, causes the rotation of the revolving lever 196. When the revolving lever 196 rotates in the counterclockwise direction of the figure, the sub-chassis 126 rotates downward with the pin 128 as the fulcrum, and when the revolving lever rotates in the clockwise direction, the sub-chassis 126 rotates upward.

In this manner, by revolving the sub-chassis 126 within a small range of angles by any one of these methods, it becomes possible to carry out the operations of loading and unloading of the disk 14 through the use of a simplified mechanism, without requiring the raising/lowering action of the lifter 18 and the disk clamper 24, as was the case in the prior art.

In particular, when the sloped cam 184 is utilized, the disk can be clamped stably against vibrations in either of the lateral or longitudinal direction since the base of the sloped cam 184 can be kept stable at all times by having it make contact with the main chassis 124.

Figure 20:
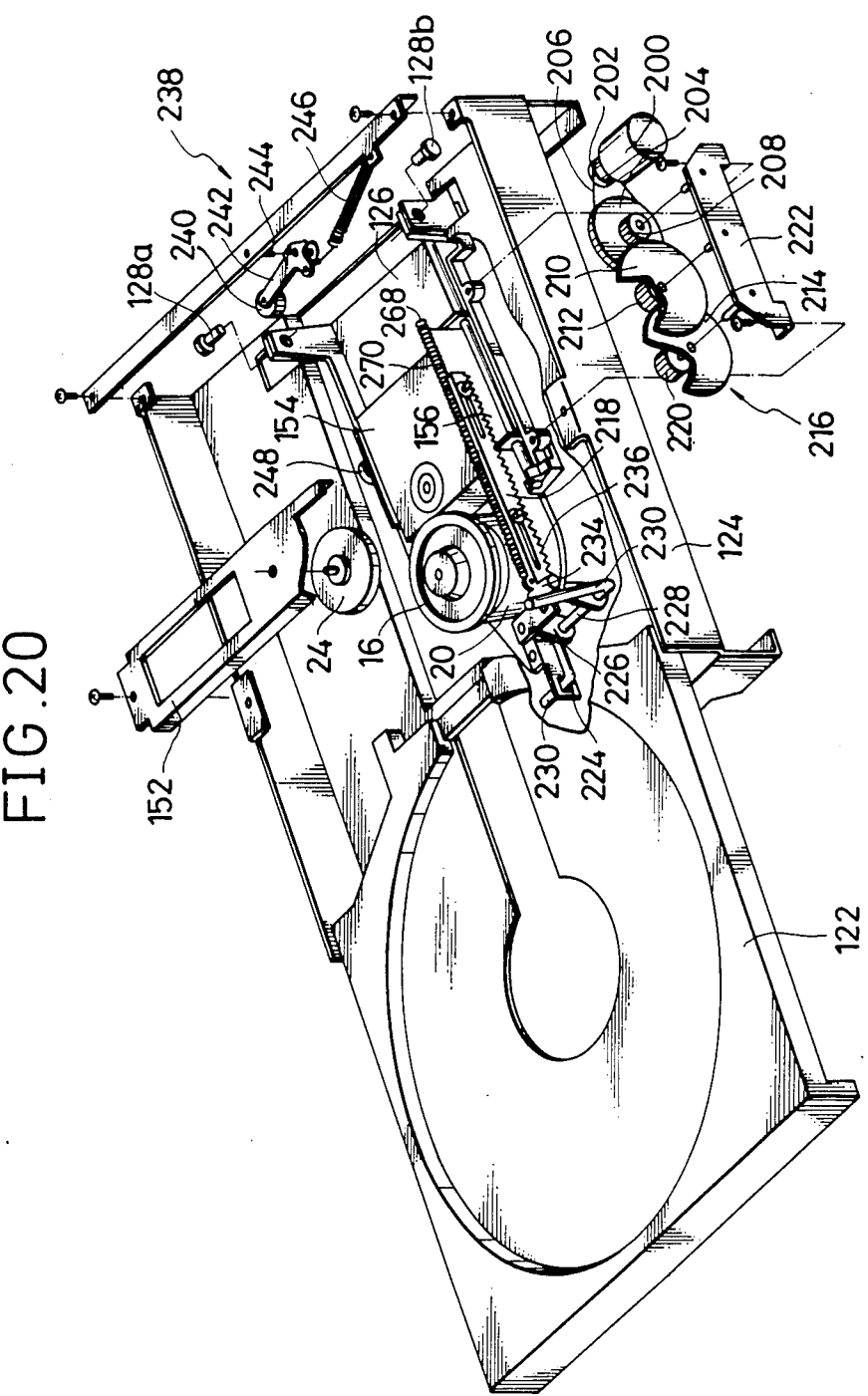
FIG. 20 is an overall perspective view of a second embodiment of a recorded disk playback apparatus in accordance with the present invention.

In FIG. 20 is shown another embodiment of the playback apparatus in which a motor along with a speed reduction mechanism are arranged to power the loading/unloading drive and the feeding drive for the pick-up.

In FIG. 20, the sub-chassis 126 is attached as revolvable to the main chassis 124 with pins 128a and 128b at two points on one of its ends. Further, installed on the sub-chassis 126 are the turn table motor 20, on which is mounted the turn table 16 that rotates with the disk on it, and the carriage 156, which moves in the radial direction of the disk with the incorporated pick-up head 154 for reading and playback the signals.

Differing from the prior art apparatus, the slide table 122 here is formed in a unified body without requiring any ascent/descent of the part on which the disk is placed.

In the space above the turn table 16, there is installed a disk clamper 24 on a center stay that is fixed to the main chassis 124 in a manner to be able to rotate with the disk as one body during the playback operation.

The rotation of a motor 200, which serves both the loading drive for the disk and the feeding drive for the pick-up head, is reduced by a speed reduction mechanism 216 consisting of a small pulley 202, a large pulley 204, a belt 206, a first gear 208, a second gear 210, a third gear 212, and a fourth gear 214, and is transmitted to a pinion 220 that is engaged with a rack 218 at all times. The reduction gears 208, 210, 212, and 214 and the pulleys 202 and 204 are fixed to the sub-chassis 126 by being incorporated in a bracket 222. Here, the motor 200 may be installed together with the speed reduction mechanism 216 either on the sub-chassis 126 or on the main chassis 124. The belt 206 which is stretched between the motor 200 and the pulley 204 is arranged to be relatively flexible so that the mechanism for transmitting the rotation will be little affected when there is caused, due to a rotation through a small angle of the sub-chassis 126, a slight change in the relative position between the motor 200 installed on the chassis side and the pulley 204 which is on the sub-chassis 126 side.

In order to raise/lower the sub-chassis 126 by rotation, the arm 230 at one of the ends of a metallic crank 228, which is supported in a revolvable manner in a bracket 226 that is fixed to the main chassis 124, is inserted in a slit 224 that is provided at the front end of the sub-chassis 126.

The arm 230 at the other end of the metallic crank 228 is positioned so as to make direct contact with the head section 234 or a rack 218 during the loading and unloading of the disk. Although it is omitted from FIG. 20, the sub-chassis 126 is always energized to rotate in the direction in which the turn table 16 is to be raised, by means of a spring 236. (See the spring 236 shown in FIGS. 25 and 26.) Furthermore, the push-back mechanism 238 for carrying out the pushing-out of the slide table 122 is constructed as follows: the push-back lever 242, with a freely rotatable roller 240, is installed at the rear of the main chassis 124, in a manner so that it is freely revolvable, with a supporting pin 244. One of the ends of the push back lever 242 is arranged to be always pulled in the same direction that the slide table 122 is pushed out by the force of a spring 246.

Figure 21:
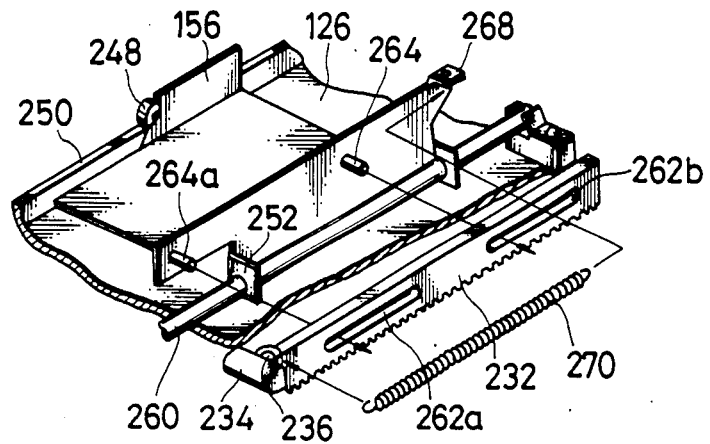
FIG. 21 is a perspective view of a carriage section of the present invention.

Therefore, when the locking mechanism (figure omitted) that has been locking the slide table 122 is released, the slide table 122 is pushed out by the push-back mechanism 238 several centimeters, so that it becomes possible to draw it out manually. In FIG. 21, the feeding operation of the pick-up head 154 (not shown) is carried out with the carriage 156 being guided in the radial direction of the disk by means of a roller 248 that is installed revolvably on the carriage, a guiding rail 250 installed on the sub-chassis 126, and a guiding rod 260 that is inserted in a bearing 252 prepared on the carriage 156.

The rack 232 is installed on the carriage to be slidable with more than one (two in this case) long openings 262a and 262b of the rack 232, and the posts 264a and 264b, prepared protrusively on the carriage 156, serve commonly for driving the feeding of the carriage 156 which is fixed to the pick-up head 154 and for driving the loading and unloading operations of the disk.

Between a hole 236 that is prepared at one end of the rack 232 and a hole 268 that is prepared at an end of the carriage 156 is stretched a spring 270. (The role of the spring 270 will be described later.)

Figure 22:
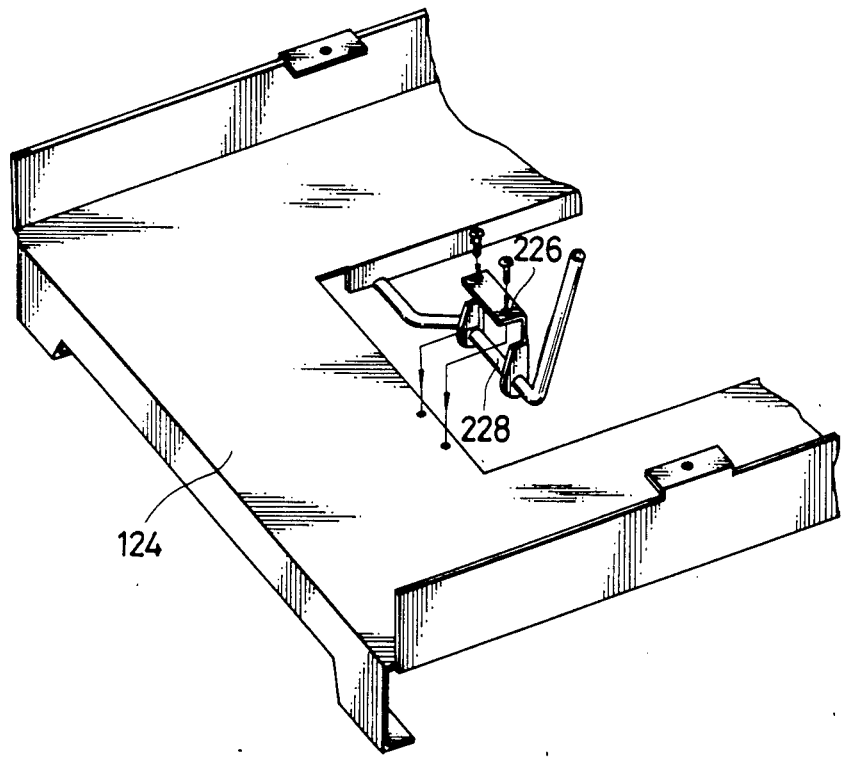
FIGS. 22 and 23 are front perspective views of the main chassis of the present invention.
Figure 23:
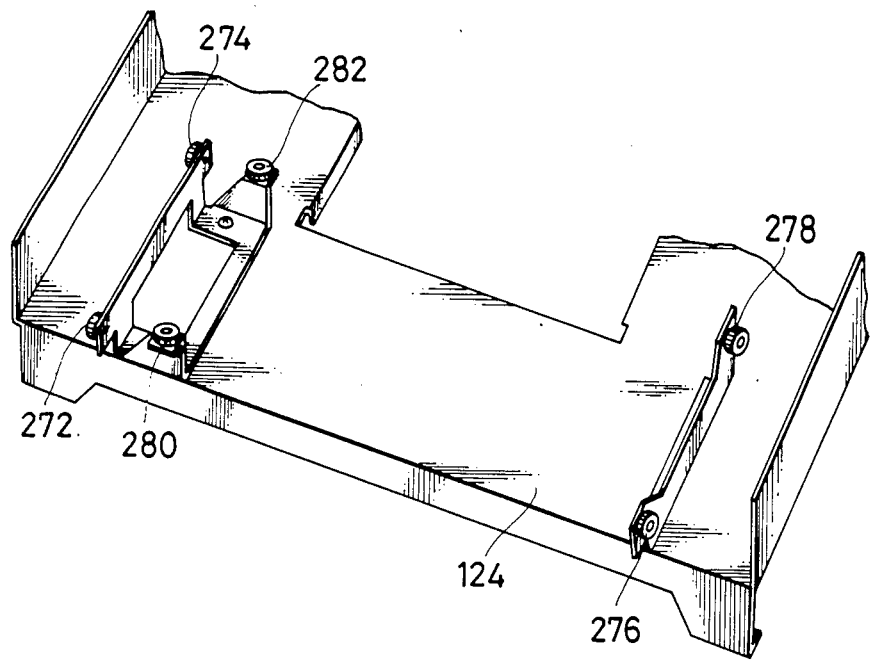

In FIG. 22, there is shown a bracket 226 which is fixed to the main chassis 124, and a metallic crank 228 held revolvably on the bracket 226. For loading an unloading the disk, the slide table 122 (not shown) has to be free to be pulled out, closed, and slided. For this reason, on the main chassis 124 there are prepared guiding rollers as shown in FIG. 23. The rollers 272, 274, 276, and 278 support the slide table in the up and down direction, while the rollers 280 and 282 support the slide table 122 in the right and left directions, to guide the motion of the slide table.

Figure 24:
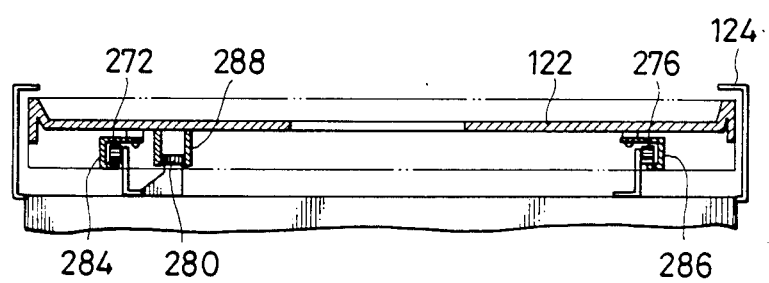
FIG. 24 is an explanatory crosssectional view of parts of the present invention.

In FIG. 24, the guiding rails 284 and 286, for eliminating the deflections in the up and down directions, and the guiding rail 288, for eliminating the deflections in the right and left directions, both being prepared on the slide table 122, engage with the rollers 274 to 282 to smooth the back and forth sliding motion of the slide table 122 with respect to the main frame 290 (see FIG. 25) of the playback apparatus.

With the above construction, when the recorded disk playback apparatus is in the normal state of its rest, the sub-chassis 126 rotates to the position shown in FIG. 26 so that the turn table 16 is in a raised position without having a disk on it.

The operation of the present invention takes place in the following manner.

(I) Pulling operation of the slide table:

First, press the set/eject button for the disk of the recorded disk playback apparatus. Then, the motor 200 shown in FIG. 20 is actuated, its rotation is transmitted to the pinion 220. The rack 218 which is geared with the pinion 220 moves forward to the front of the main frame 290 of the playback apparatus. Here, the carriage 156 is restrained by a stopper 292 from moving further forward, so that the rack 218 alone moves forward, with the spring 270 being stretched. Then, the posts 264a and 264b on the carriage 156 slide in the long openings 262a and 262b of the rack 218 from their front ends to their rear ends. In this operation, the head section 234 of the forward moving rack 218 pushes the arm 230 of the metallic crank 228, and revolves the metallic crank 228, which lowers the sub-chassis 126. When the metallic crank 228 inclines completely toward the lower front, the rotation of the motor 200 is stopped by the action of the first microswitch (not shown). The lock (not shown) on the slide table 122 is released at the same time with the completion of the descent of the sub-chassis 126, and the roller 240 on the push-back lever 242 shown in FIG. 20 pushes out the slide table 122 by the force of the spring 246.

As a result of the above actions, the slide table 122 is pulled out for an amount which is sufficient for taking in and out of the disk.

(II) Loading operation of the disk:

The disk 14 is placed on the slide table 122 as shown in FIG. 25, and the slide table 122 is pushed in. When the slide table 122 is closed, the slide table 122 is locked. When a second microswitch (not shown) is actuated to start the motor 200 shown in FIG. 20, the rack 218 which is geared with the pinion 220, shifts to the rear of the main frame 290 of the playback apparatus as illustrated by FIGS. 25 to 26.

At this time, the sub-chassis 126, which is being pulled upward by the spring 236, receives a force that causes it to rotate in the upward direction of the main frame 290 of the playback apparatus, utilizing the pins 128a and 128b as the supporting axes. Due to the recession of the rack 218, the sub-chassis 126 rotates to the position shown by FIG. 26, shifting the arm 230 of the metallic crank 228 to another position because of its linkage. As the sub-chassis 126 rotates, the disk 14 is lifted by the turn table 16, which is being raised, and is pressed against the disk clamper 24. When the turn table 16 is raised to a fixed position by the turning of the sub-chassis 126, the rotation of the motor 200 is interrupted by the action of a third microswitch (not shown). In this manner, the disk 14 is clamped between the turn table 16 and the disk clamper 24, completing the loading of the disk.

(III) Playing operation:

In the state represented by FIG. 26 in which loading of the disk is finished, the posts 264a and 246b (See FIGS. 27(A)-27(D)) of the carriage 156 are situated approximately at the front ends of the long openings 262a and 262b on the rack 218.

By pressing the play button in this state, the motor 200 shown in FIG. 20 is actuated, transmitting its rotation to the pinion 220, and sending the rack 218 toward the rear of the main frame 290 of the playback apparatus. When there are no gaps left between the posts 264a and 264b and the long openings 262a and 262b, the carriage 156 with the pick-up head placed on it, as shown by FIG. 20, moves solidly with the rack 218, realizing a playback state.

In FIG. 26, the carriage 156 is situated at the position of the innermost periphery of the disk 14, and the pick-up head 154 is at the initial position of the running stroke. During the playback, the carriage 156 moves from the position of the innermost periphery to the outermost periphery of the disk 14.

(IV) Unloading operation of the disk:

In the state in which the playback operation is complete, the carriage 156 is brought to the outermost periphery of the disk 14, or when the stop button is pressed in the state of playback, even if pressed during the feeding stroke of the carriage 156, the rack 218 is sent back to the innermost periphery position of the disk.

Then, together with the rack 218, the carriage 156 is returned to the starting position for playback by the pulling force of the spring 270 and direct contact with the stopper 292. When direct contact is accomplished, the rotation of the motor 200 is interrupted by the action of a fourth microswitch (not shown), stopping the shift of the rack 218, and hence also of the carriage 156.

When the set/eject button is pressed in this state, the motor 200 is actuated and the rack 218 is moved to the front of the main frame 290 of the playback apparatus. However, since the carriage 156 is held back by the stopper 292, the posts 264a and 264b on the carriage 156 slide from the front ends to the rear ends of the long openings 262a and 262b on the rack 218, and the rack 218 alone is moved. The head section 234 of the rack 218 pushes the arm 230 of the metallic crank 228, and causes the sub-chassis 126 to move downward with the pins 128a and 128b as the fulcrums.

At the moment when the metallic crank 228 is pushed completely to the lower front, the first microswitch (not shown) is actuated to interrupt the rotation of the motor. At the same time with the completion of the descent of the sub-chassis 126, the lock (not shown) on the slide table 122 is released, and the roller 240 on the push-back lever 242 shown in FIG. 20 pushes out the slide table 122 due to the force of the spring 246. This makes it possible to remove the disk 14.

Next, the operation of the rack 218 and the carriage 156 will be described using FIG. 27 by making reference to FIGS. 20 and 21.

Figure 27A:
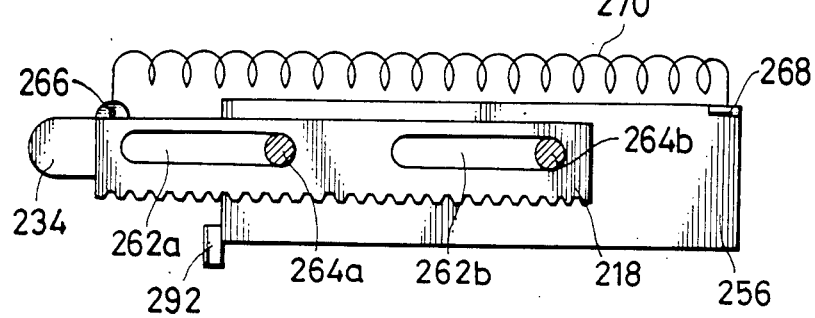
FIGS. 27(A)–27(D) illustrate the operation of the carriage and the rack of the present invention.

FIG. 27(A) shows the state in which the rack 218 is at the front end of the main frame 290 of the playback apparatus and the sub-chassis 126 is lowered. When the slide table 122 is closed, the motor 200 is actuated and its rotation is transmitted to the pinion 220, the rack 218 slides to the rear of the main frame 290 of the playback apparatus. At this time, the posts 264a and 264b that are set on one side of the carriage 156 slide from the rear ends of the front ends of the long openings 262a and 262b on the rack, slide continuously until at least one of the posts 264a and 264b makes a direct contact with the front end of the long opening 262a or 262b. With this operation, the sub-chassis 126 is raised as described previously, making it possible to carry out the loading of the disk.

Figure 27B:
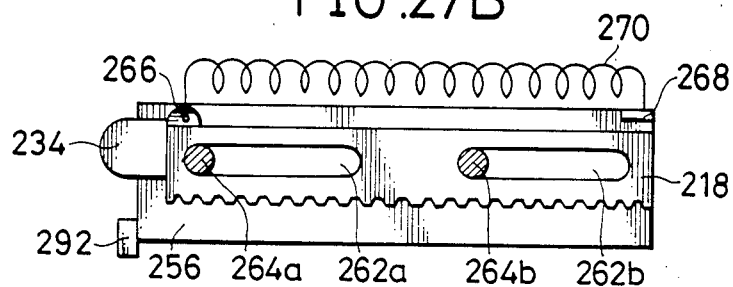

FIG. 27(B) shows the state in which the carriage 156 of the rack 218 is at the starting position of playback. When the play button is pressed in this state, the rack 218 slides to the rear of the main frame 290 of the playback apparatus, and the carriage 156 interlocks with the rack 218 because the posts 264a and 264b are making direct contact with the long openings 262a and 262b. Since the pick-up head 154 is fixed to the carriage 156, the pick-up head 154 moves in one body with the carriage 156 from the innermost periphery to the outermost periphery of the disk 14, carrying out the playback.

Figure 27C:
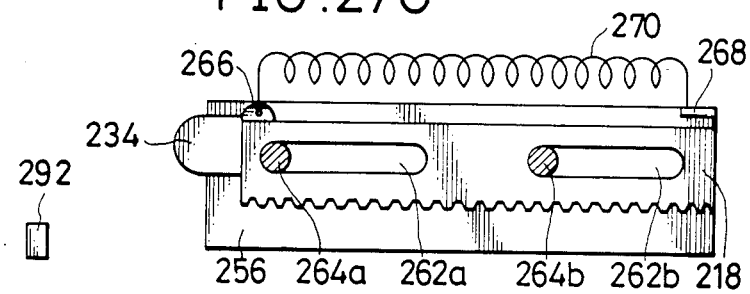

FIG. 27(C) shows the state in which the rack 218 and the carriage 156 are in the positions corresponding to the completion of playback. When the stop button is pressed in this state, the rack 218 moves to the front of the main frame 290 of the playback apparatus, and being interlocked with the rack 218 the carriage 156 slides along with it. Rack 218 is pulled by the elastic force of the spring 270 that is stretched between the hole at the front end of the rack 218 and the hole at the rear end of the carriage 156.

Figure 27D:
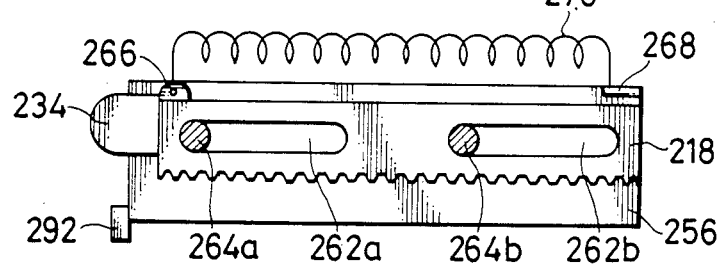

FIG. 27(D) shows the state in which the rack 218 and the carriage 156 are returned to the starting position of playback. In this state, the carriage 156 is held back by the stopper 292 from moving any further into the front. When the eject button is pressed in this state, the rack 218 alone slides further forward due to the constraint on the carriage 156 by the stopper 292 stretching the spring 270. Then, due to the push given by the head section 234 of the rack 218 on the arm 230 of the metallic crank 228, the sub-chassis 126 moves downward, permitting the unloading of the disk 14.

In addition, although the spring 270 is used in the above description for interlocking the carriage 156 and the rack 218, it may be replaced by anything, such as an elastic body of rubber, as long as it serves a similar function.

As described in the foregoing, since a sub-chassis is provided and the disk receiving section is formed into a unified body with the slide table, it is possible to carry out the required operation without the use of a lifter, a mechanism such as cams and links for raising/lowering the lifter, and a mechanism for raising/lowering the disk clamper. This leads to an improvement in the reliability of the apparatus.

Figure 28:
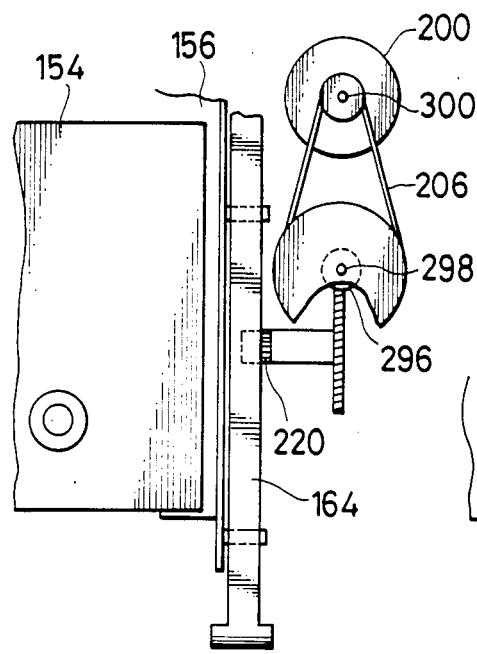
FIGS. 28 to 30 are simplified diagrams for illustrating the modifications to the motor and speed reduction mechanism used in the present invention.
Figure 29:
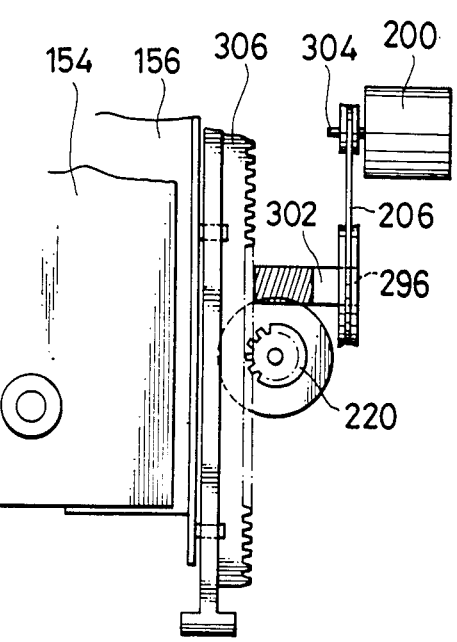
Figure 30:
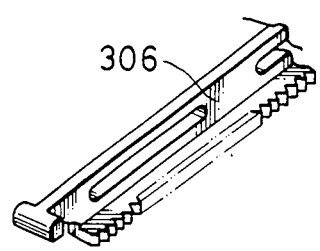

In FIGS. 28 and 29 there are illustrated the cases in which the speed reduction mechanism 216 for the motor 200, which serves commonly for feeding the loading drive and the pick-up head, is replaced by the use of a worm gear. In FIG. 28, the center axes 298 and 300 of the worm gear 296 and the motor 200, respectively, are both arranged in a direction perpendicular to the rack 164. In FIG. 29, the center axes 302 and 304 of the worm gear 296 and the motor 200, respectively, are both arranged in a horizontal direction, with a simplified diagram of the rack 306 as shown by FIG. 30. Compared with the apparatus shown in FIG. 20 in which use is made of a combination of flat gears, both of the apparatus in FIGS. 28 and 29 permit a reduction in the number of parts and the space required for the speed reduction mechanism.

Figure 31:
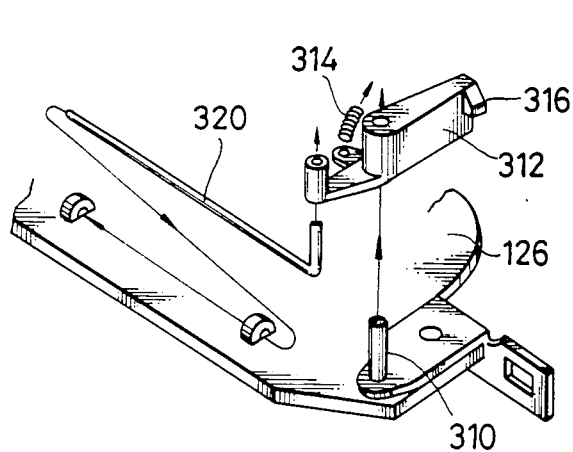
FIGS. 31 to 33 are diagrams for illustrating the locking mechanism of the sub-chassis in accordance with the present invention.
Figure 32:
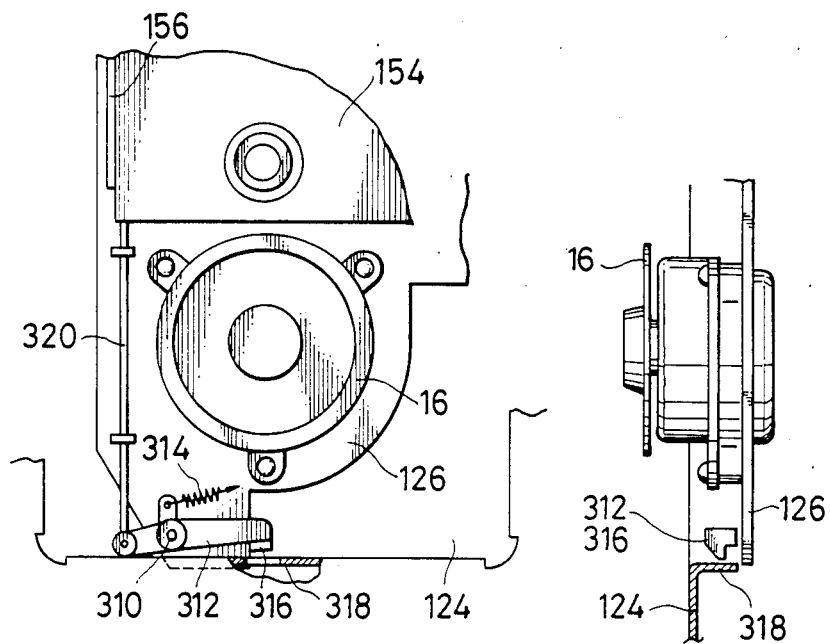
Figure 33:
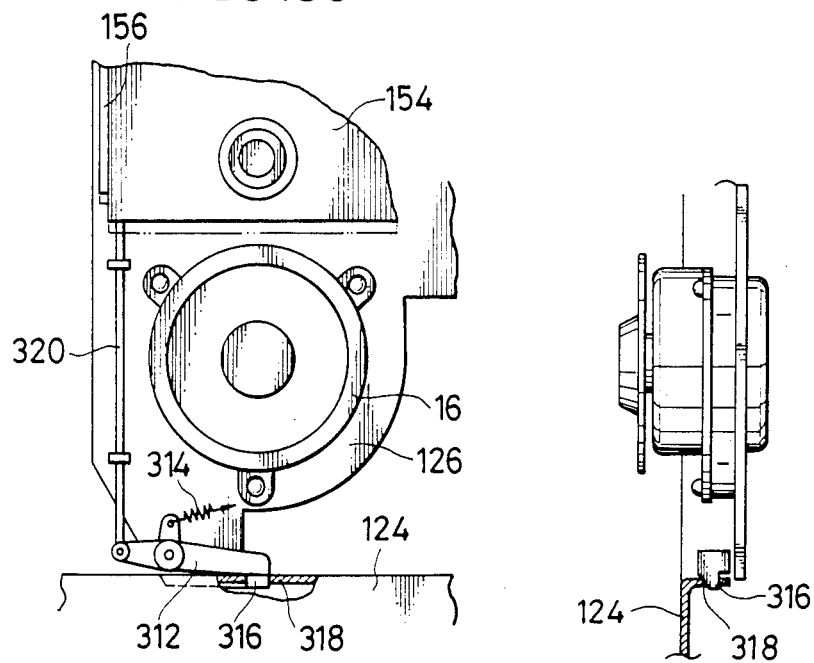

FIGS. 31 to 33 illustrate the mechanism by which the main chassis 124 is locked during the playback operation to prevent the lowering of the sub-chassis 126.

The raised state of the sub-chassis 126 is maintained by the elastic force of the spring 236 shown in FIGS. 25 and 26. If vibrations or shocks in the vertical direction are applied to the apparatus, it is possible that the turn table 16, which holds the disk 14 on it, may be displaced downward. In extreme cases, there exists a fear of damaging the disk 14 or the playback apparatus due to contact between the disk 14 in rotation and the slide table 16. This is the reason why the sub-chassis 126 is locked to prevent its descent during the playback.

As shown in FIG. 31, a locking lever 312 is fitted to a post 310 which is provided in the tip area of the sub-chassis 126, and is energized by a spring 314 in the clockwise direction as seen from the top of the main frame 290 of the playback apparatus. On one end of the locking lever 312 there is formed a projection 316 to be used for locking. At the raised position of the sub-chassis 126, there is prepared a slit 318 on the main chassis 124 side, as shown in FIGS. 32 and 33, at a position facing the projection 316. The other end of the locking lever 312 is linked to the connecting rod 320, and when the sub-chassis 126 is displaced by turning, as shown by FIG. 32, the connecting rod 320 is pushed by the pick-up head 154, regulating the turning of the locking lever 312. In the reproduction state as shown by FIG. 33, the carriage 156, with the pick-up head 154 placed on it, is shifted to the rear of the main frame 290 of the playback apparatus, so that the connecting rod 320 is released and the locking lever 312 turns in the clockwise direction as seen from the top of the main frame 290 of the playback apparatus. Then, the projection 316 on the locking lever 312 enters the slit 318 prepared on the main chassis 124, locking the sub-chassis 126 to prevent its descent. In this manner, it is possible to obtain a safe and highly reliable playback apparatus by securely locking the disk in the loaded state, during the playback operation with the rotating disk 14, to prevent damage to the disk 14 or the playback apparatus that may be caused by unexpected vibrations or shocks.

Figure 34:
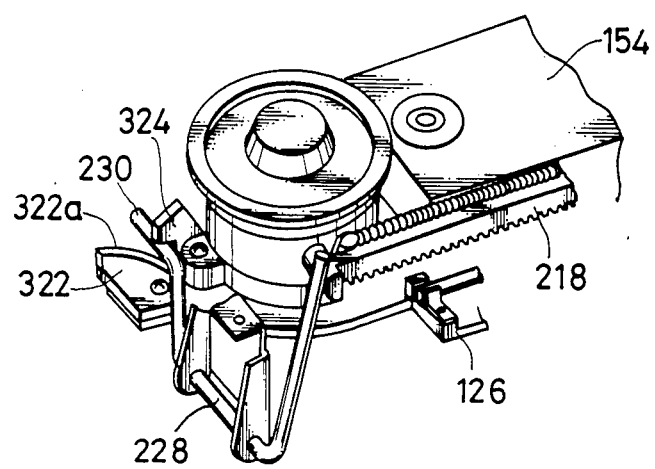
FIGS. 34 and 35 are a perspective view and a partial explanatory view of the sub-chassis in accordance with the present invention.
Figure 35:
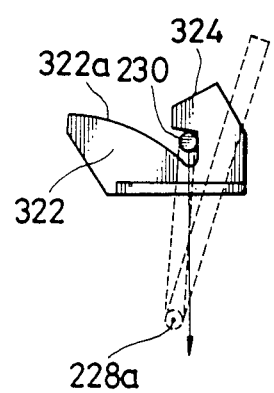

In FIG. 34 a cam 322 is used in place of the slit that is provided, as shown in FIG. 20, at the tip of the sub-chassis 126. In accordance with this, the metallic crank 228 is given the shape, shown by FIG. 35, which the arm 230 of the metallic crank 228 is at a position where it makes direct contact with the cam 322. On the cam 322 there is provided, as shown in FIG. 35, a lock 324, for preventing the descent of the sub-chassis 126 from its raised position, which is caught by the arm 230 of the metallic crank 228.

FIGS. 36 and 37 show the operating states of the above embodiment. In FIGS. 36 and 37, the parts that are identical or equivalent to those shown in FIGS. 25 and 26 are given the same symbols to omit further explanation.

When the metallic crank 228 rotates, with the revolving fulcrum 228a of the metallic crank 228 as the axis, due to being pushed by the rack 232 as shown by FIG. 36, the arm 230 of the metallic crank 228 rotates and pushes the curved slope 322a of the cam 322, causing the sub-chassis 126 to descend while turning.

Next, when the slide table 122 is closed as in FIG. 37, the rack 232 moves to the rear of the main frame 290 of the playback apparatus. This causes the metallic crank 228 to be turned toward the front side of the main frame 290 of the playback apparatus. The arm 230 of the metallic crank 228 is made to descend along the curved slope 322a of the cam 322, raising the sub-chassis 126. When the sub-chassis 126 has completed its ascent, the lock 234 is held at a position where it is caught and stopped by the arm 230 of the metallic crank 228, even when a force is applied which could cause the sub-chassis 126 to descend. The forms of the metallic crank 228 and the cam 322 and the configuration between them are designed to avoid allowing the point of action combined with the direction of the relevant force to generate a rotational moment with respect to the turning fulcrum 228 of the metallic crank 228, even when vibrations or shocks are applied to the arm 230 of the metallic crank 228 in the vertical direction. This tends to turn the metallic crank 228 in a direction away from the rear towards the front of the main frame 290 of the playback apparatus. Due to this arrangement the rotation of the sub-chassis 126 in the direction of its descent is restrained.

It is known that in the ascent of the sub-chassis 156, a satisfactory result can be obtained by energizing the metallic crank 228 toward the rear of the main frame 290 of the playback apparatus, by means of a weak spring (figure omitted) in order to smooth the descent of the arm 230 of the metallic crank 228 along the curved surface 322a. Also, a smoother operation is known to be obtained by giving a roller structure to the arm 230 of the metallic crank 228.

With a mechanism like in the above, even when strong vibrations or shocks are applied in the vertical direction to apply a force to lower the sub-chassis 126, after the disk 14 has started to rotate, the descent of the sub-chassis 126 is restrained, which makes it possible to avoid injury or damage that may be caused by the contact of the disk 14 in rotation with the slide table 16.

This creates a stable and highly reliable playback apparatus.

Another embodiment of the present invention, a mechanism which includes a slide table, a lifter, and an ascent/descent cam, will be described below by referring to FIGS. 38 and 39.

Figure 38:
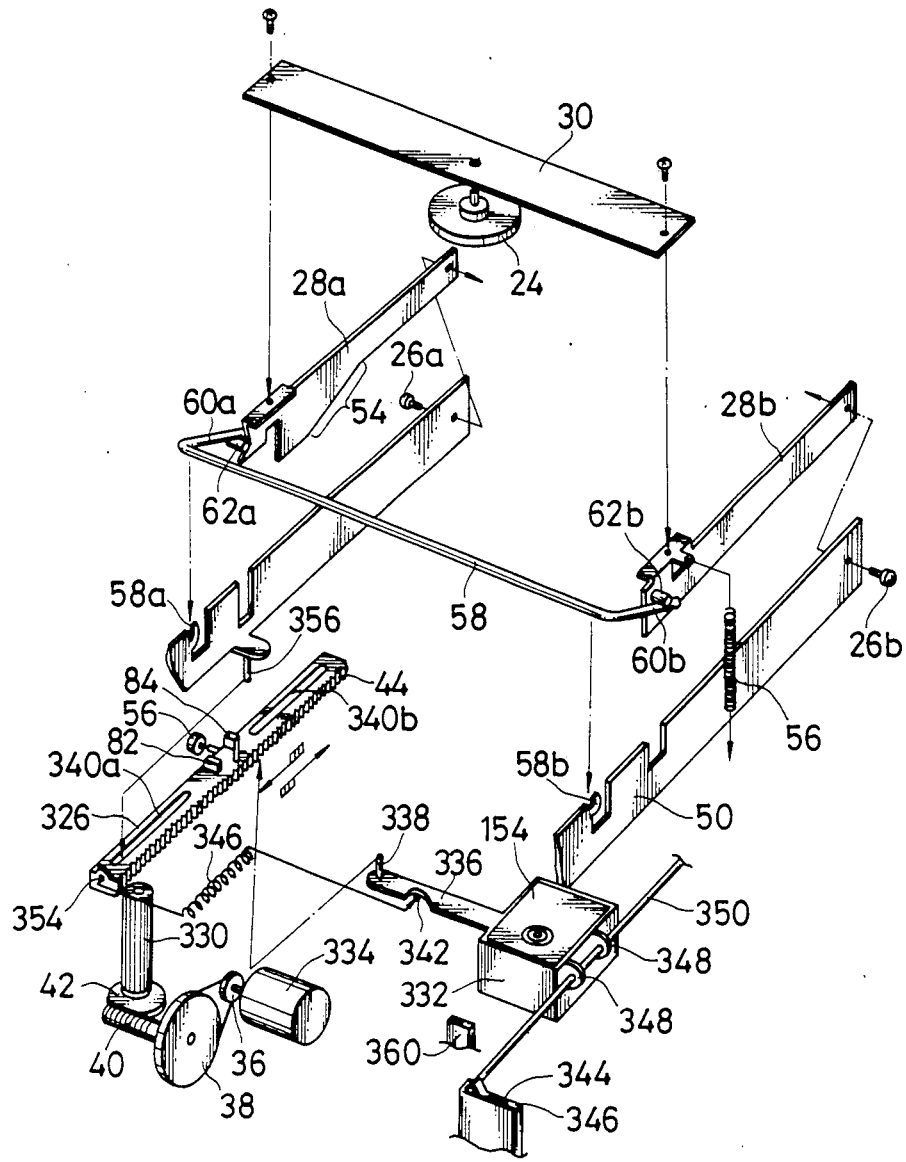
FIG. 38 is a perspective view of another embodiment of the present invention.

In FIG. 38 an apparatus is shown in which one motor serves commonly for the loading drive and pickup head feeding. The parts that are identical or equivalent to the prior art components, as shown in FIG. 20, are given identical symbols to omit further explanation.

Figure 6:
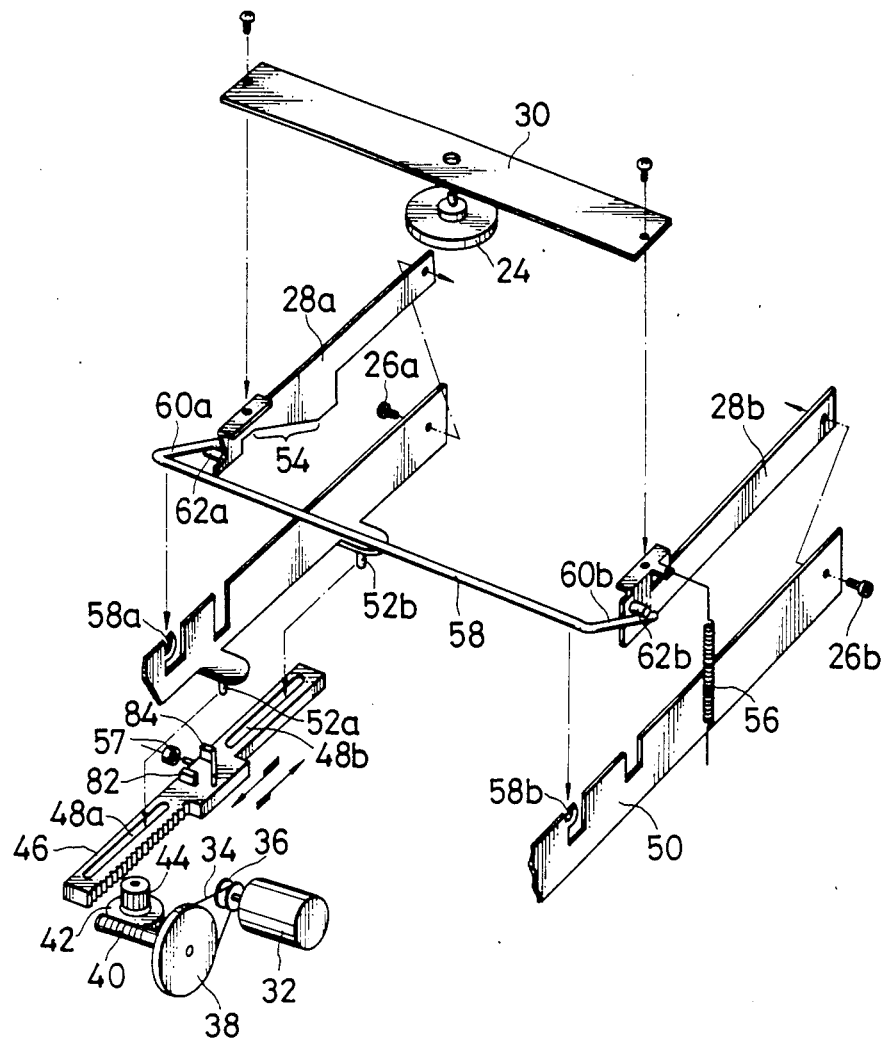
FIGS. 6 and 7 are perspective views of the loading mechanism according to the prior art recorded disk playback apparatus.
Figure 7:
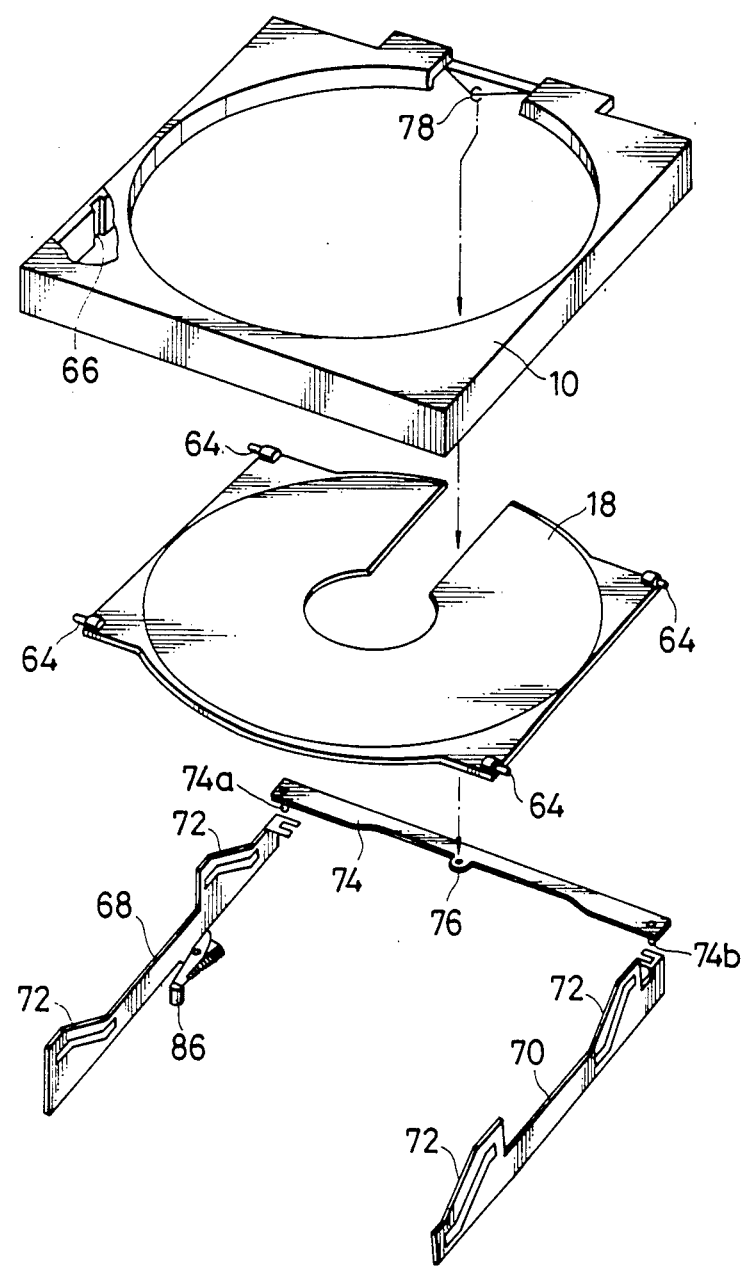
Figure 8:
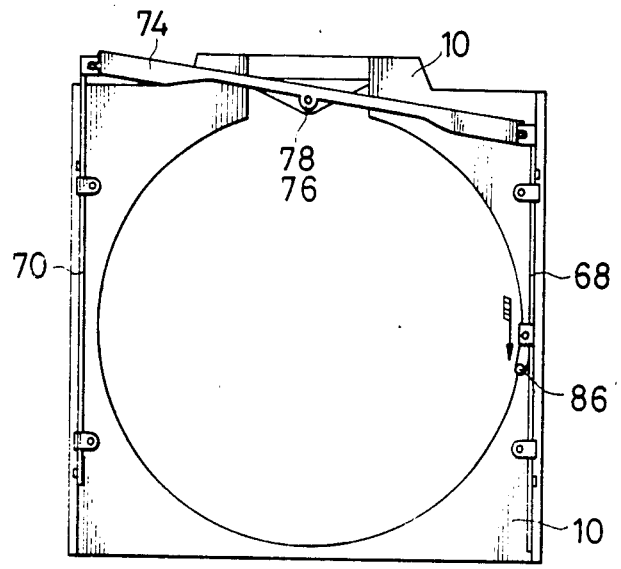
FIGS. 8 and 9 are views from bottom of the prior art slide table structure.
Figure 9:
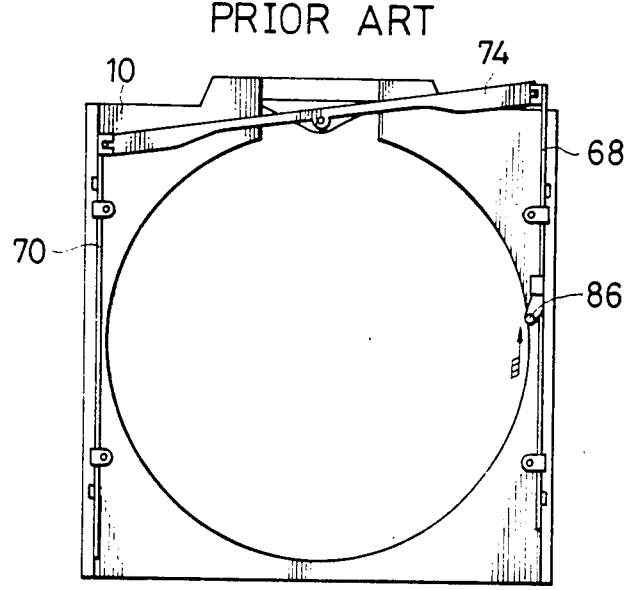
Figure 10:
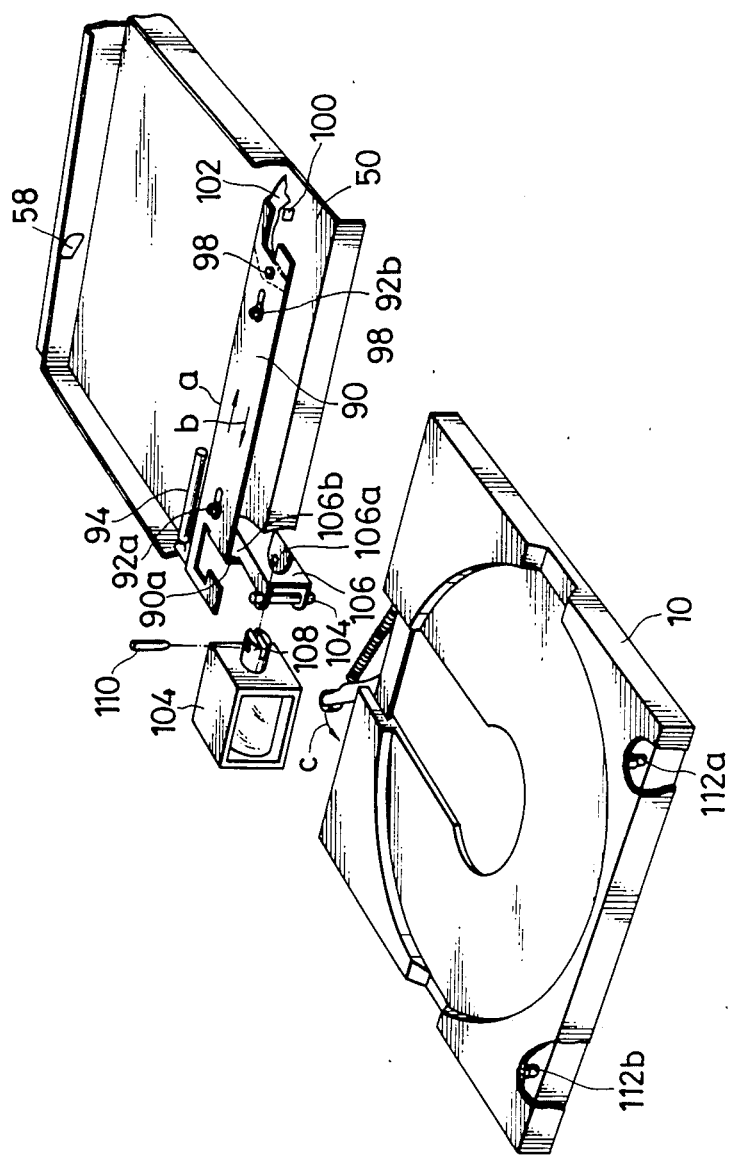
FIG. 10 is a perspective view for illustrating the locking/unlocking mechanism of the slide table according to the prior art.

A rack 326, in which the entire range of one side of the rack 46 used for the recorded disk playback apparatus shown in FIG. 6, is replaced by a gear 328 to permit a wide range of slide. The rack 326 is geared with a pinion 330 which extends downward from the lower part of the main frame 290 of the playback apparatus. The reason for this is to avoid contact between a newly installed carriage 332, while it is moving, with the motor 334 and others. This is facilitated by extending the pinion 330 into the lower section of the main frame 290 of the playback apparatus where a space is available.

A post 338, erected at the tip of the arm 336 of the carriage 332, is inserted slidably into a long opening 340b on the rack 326 so that the carriage 332 is slidable back and forth with respect to the main frame 290 of the playback apparatus. Between a hole 342, prepared in the arm 336 of the carriage 332, and a hole 354, prepared at the tip of the rack 326, there is stretched a spring 346 which has an operating effect which is similar to that of the spring 270 shown in FIGS. 20, 21, 25, 26, and 27. On the side of the carriage 332, opposite to the side on which is installed the arm 334, there are provided guiding pieces 348 which help the carriage 332 to be slided stably, guided by a guiding rod 350. The guiding rod 350 is fixed by means of a fixing piece 352 and a pin 354. The pick-up head 154 is fixed to the carriage 332, to move solidly with the carriage 332, and shifts during playback from the innermost periphery side to the outermost periphery side of the disk 14.

The operation of an apparatus with the above construction will now by described by referring to FIGS. 38 and 39. FIG. 39(A) illustrates the state in which the disk clamper 24 is raised without clamping the disk 14. In this state, the motor 334 is actuated to transmit its rotation to the pinion 330 causing the rack 326 to slide from the state in which it is situated at the rear (direction to the right of the figure) of the main frame 290 of the playback apparatus, with the spring 346 being stretched, to the state in which the spring 346 is returned to its original state and at least one of the posts 356 and 338 makes direct contact with the front end (left end in the figure) of the long opening 340a or 340b. During this period the loading of the disk is accomplished. The operation involved is entirely the same as in the playback apparatus shown in FIGS. 1 through 9 so that no further explanation will be given here.

Figure 39A:
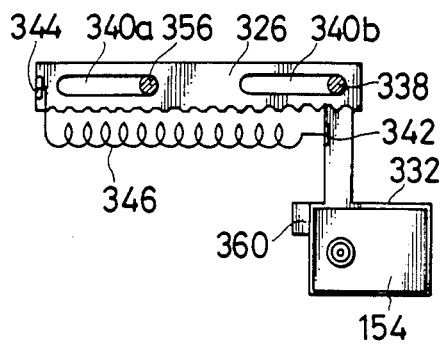
FIGS. 39(A)–39(D) show the operations of the carriage and the rack in a second embodiment of the present invention.
Figure 39B:
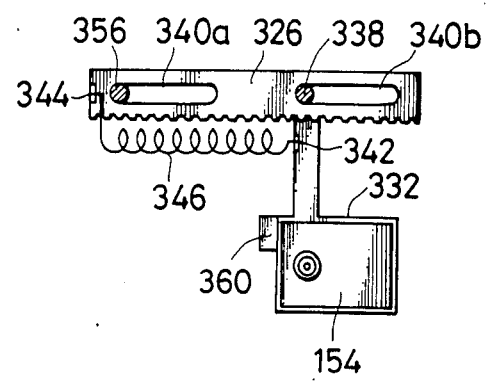

FIG. 39(B) shows the state in which the rack 326 is in the starting position of playback. The rack 326 is slided to the rear of the main frame 290 of the playback apparatus by the rotation of the pinion 330. Since, in this state, the posts 356 and 338 are in direct contact with the front ends of the long openings 340a and 340b, the carriage 332, with the pick-up head 154 placed on it, is also shifted toward the rear of the main frame 290 of the playback apparatus, that is, from the innermost periphery to the outermost periphery of the disk 14.

Figure 39C:
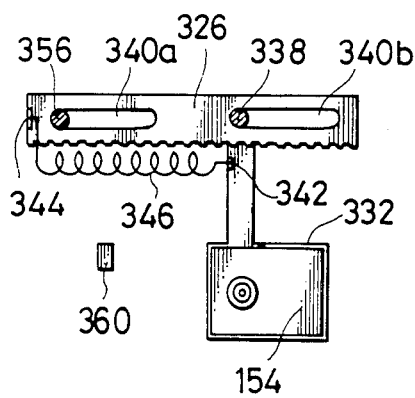

FIG. 39(C) illustrates the situation in which the pick-up head 154 is shifted to the outermost periphery of the disk 14, indicating that playback is completed.

Figure 39D:
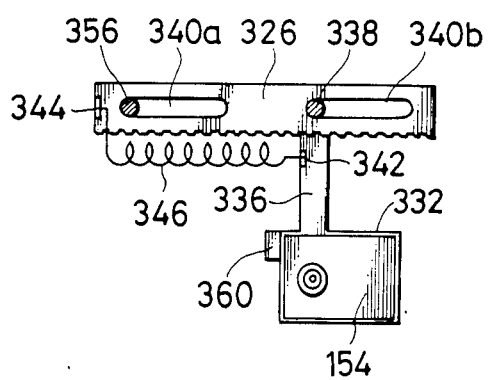

FIG. 39(D) shows the starting position for recording which is resumed for unloading the disk. In this state, the rack 326 is shifted to the front of the main frame 290 of the playback apparatus, and the carriage 332, being interlocked with the rack 326, is shifted up to a position where it makes direct contact with the stopper 360 due to the elastic force of the spring 346 stretched between the hole 344, prepared at the tip of the rack 326, and the hole 342, prepared on the arm 336 of the carriage 332.

When the switch for taking out the disk 14 is operated, the rack 326 slides further toward the front of the main frame 290 of the playback apparatus. The carriage 332 is held back by the stopper 360 so that the rack 326 alone is shifted, stretching the spring 346. When the shift is made to the position indicated by FIG. 39(A), the operation for unloading the disk 14 is completed. The operation during this period is exactly the same as in the playback apparatus shown in FIGS. 1 through 9 which has already been described so that further explanation will be omitted here.

Figure 40:
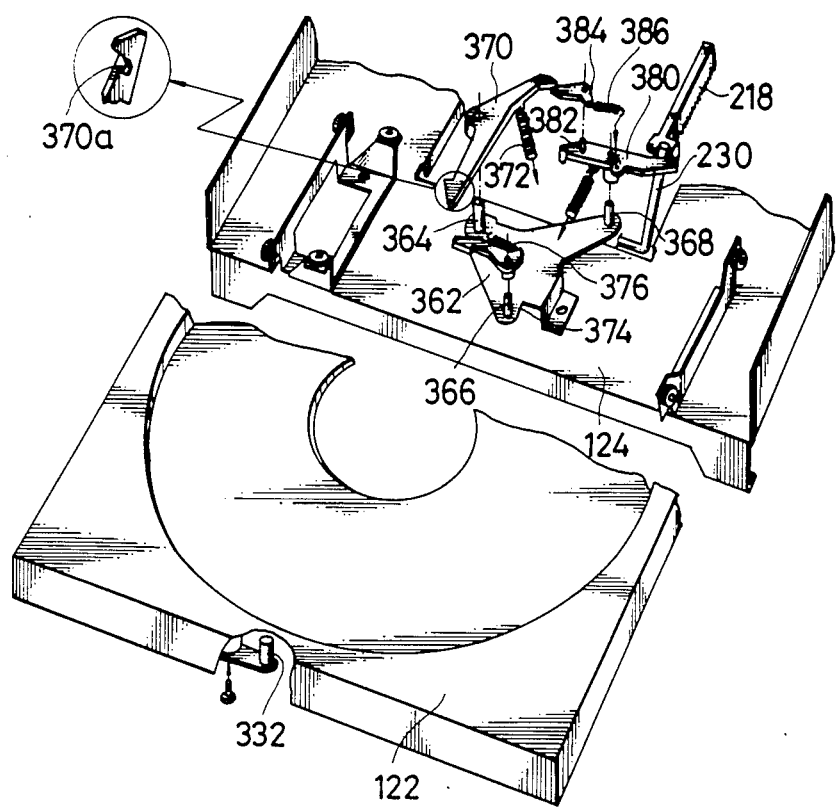
FIG. 40 is a disassembled perspective view of the locking mechanism for the slide table of the present invention.

In FIG. 40 a disassembled perspective view of the embodiment of the locking/unlocking mechanism for the slide table in accordance with the present invention is shown. The locking/unlocking mechanism is for ensuring the locking of the slide table 122 within the playback apparatus after the loading operation of the disk where the slide table 122 is pushed into the playback apparatus, as shown by FIG. 25, or during the playback operation following the loading. The locking/unlocking mechanism for this purpose, according to the present invention, is arranged to have a construction in which the release of the slide table is carried out without the use of a large-power solenoid which was used in the prior art.

In FIG. 40, three pins 364, 366, and 368 are erected on the locking mechanism bracket 362, and the locking lever 370 is held against the pin 364 by a spring.

A holding lever 374 is linked to the pin 366, and is energized by a spring 376. On the unlocking lever 380 there is erected a pin 382 to which is linked an unlocking ratchet 384, energized by a spring 386 in the counterclockwise direction, as seen from the top.

In FIG. 20 at the rear of the main frame, there are installed a push-back lever 242, for providing a force to push back the slide table 122, a supporting pin 244, a push-back spring 246, and a roller 240.

Also, at a position exactly above the turn table 1, there is mounted the disk clamper 24. The disk clamper 24 is at the center of a reinforcing component 152 that spans the left and right sides of the chassis 124. The disk clamper 24 is arranged to clamp the disk between it and the turn table, and to be able to rotate with the disk and the turn table in a unified body.

The operation of an apparatus with the above construction will be described in what follows.

In the normal state of rest, the playback apparatus will be found in a position in which the turn table is raised, as shown in FIG. 26, without having the disk on it, and the slide table 122 has been pushed into the playback apparatus and is locked there.

Figure 41A:
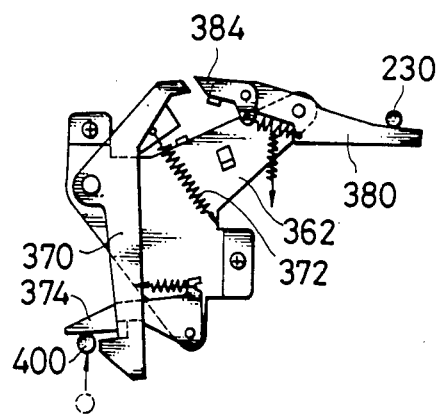
FIGS. 41(A)–41(D) show front views for illustrating the locking/unlocking operation for the slide table of the present invention.

In order to pull the slide table 122 from this state, the button for taking out the disk is pressed. The motor 200 is actuated to move the rack 218 forward, the rack pushes the arm 230 of the metallic crank 228 in the forward direction, lowering the sub-chassis 126. Just before the lowering of the sub-chassis is completed, the arm 230 of the metallic crank 228 pushes the unlocking lever 380 as in FIG. 41(d), turning it in the clockwise direction as seen from the top, changing the situation from what is shown in FIG. 41(d) to what is shown in FIG. 41(a). Next, the unlocking ratchet 384 on the unlocking lever 380 causes the locking lever 370 to revolve in a counterclockwise direction, and the unlocking lever 370 releases its hold from the locking post 398 on the slide table 122. This causes the rotation of the motor 200 to be interrupted. Then, the slide table 122 is pushed forward by the action of the push-back arm 388 to permit the slide table to be taken out.

There are two cases in which the slide table 122 is pulled out, namely, when taking the disk out from the playback apparatus and when unloading the disk. The mechanical operations of the playback apparatus for these cases are identical except for the presence or absence of the disk.

There are two cases in which the slide table 122 is pushed in, namely, when the slide table is pushed in after the disk is removed and when the disk is going to be loaded. In these cases, too, the mechanical operations inside the playback apparatus are identical except for the presence or absence of the disk.

When the slide table 122 is closed, the holding lever 374 recedes due to being pushed by the locking post 400 of the slide table, as shown by FIG. 41(a). The protuberance 370a (see FIG. 40), which is on the reverse side of the locking lever 370, that is being caught by the holding lever 374, is released from the holding lever 374, turned by the force of the spring 372, and accomplishes the locking of the slide table 122 by pressing the locking lever with the locking post 400, as shown by FIG. 41(b).

Figure 4:
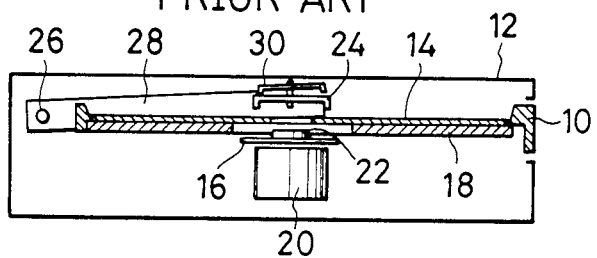
Figure 5:
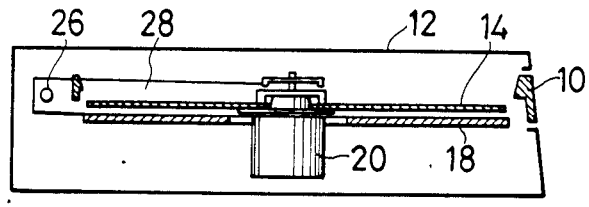

When the motor 200 is actuated by the sensing the locking of the slide table with a microswitch (not shown) or the like, the rack 218 starts to recede. Since the arm 230 of the crank recedes also, the turn table 16 is raised as shown in FIG. 4 from the state of FIG. 3, accomplishing the loading when there is a disk.

Figure 41B:
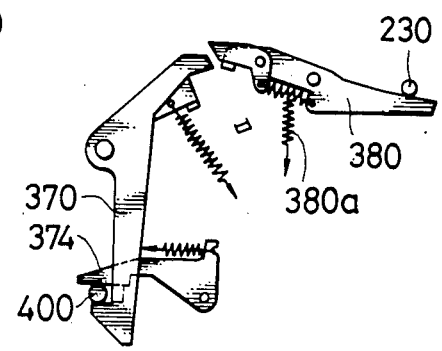
Figure 41C:
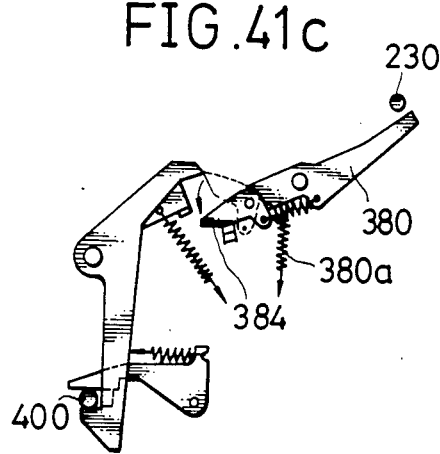
Figure 41D:
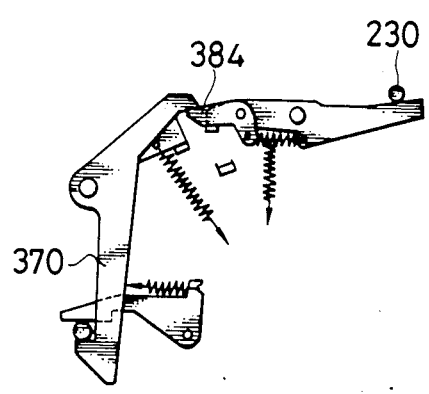

At the same time, the unlocking lever 380 is turned counterclockwise as shown in FIG. 41(c) by the force of the spring 380a as the arm 230 of the crank leaves the state represented by FIG. 41(b). In this process, the unlocking ratchet 384 passes by the tip of the locking lever 370 while being turned from the state shown by the broken line to the state shown by the solid line in FIG. 41(c).

Now the preparation is complete for unlocking the slide table 122. When the unlocking lever 380 is pressed again by the arm 230 of the crank, the unlocking action is carried out as from FIG. 41(d) to FIG. 41(a).

As described in the above, in the present invention an unlocking mechanism with an unlocking ratchet, which is driven by the use of the power for loading/unloading, instead of a solenoid and an arm for transmitting the suction power of the solenoid to the locking plate are employed. This makes it possible to obtain a disk loading mechanism which is less expensive and small both in size and weight, by doing away with expensive parts.

In FIG. 42 another embodiment of the mechanism is shown. FIG. 42(a), (b), (c), and (d) show the operational states of the mechanism which are obtained by deleting the unlock holding lever 105 from the embodiment shown by FIG. 41. When the button for taking the disk out from the playback apparatus is operated to pull out the slide table, from the resting state or the playback state of the playback apparatus, the turn table 16 is lowered by a forward push of the crank arm 230 caused by the motion of the rack. At the same time, the unlocking lever 380 is pushed, as shown in FIG. 42(d), and turns the locking arm 370 in the counterclockwise direction via the unlocking ratchet 384, and releases its hold on the locking post 400 of the slide table shown as in FIG. 42(a), thus pulling out the slide table.

Figure 42A:
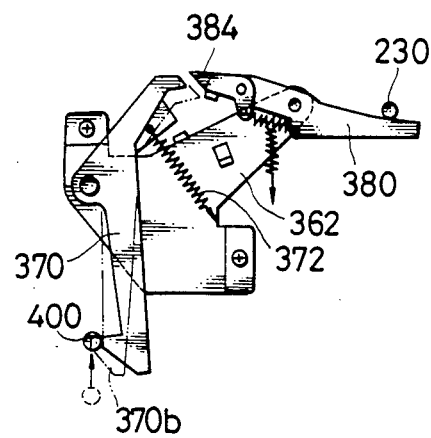
FIGS. 42(A)–42(D) show front views for illustrating the operation of a modification to the present invention.

When the unlocking ratchet 11 completes its passage, the locking lever 370 ends up as represented by the doubly dotted broken line in FIG. 42(a) due to the action of the spring 372. In this embodiment use is not made of the unlock holding lever 374 as in the previous embodiment shown in FIG. 41(a).

Figure 42B:
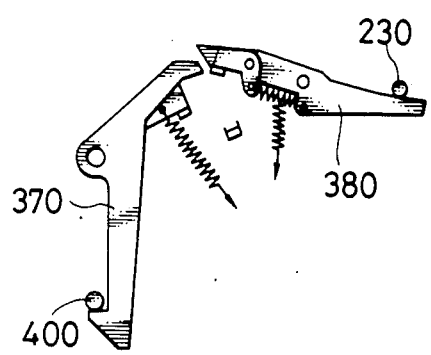
Figure 42C:
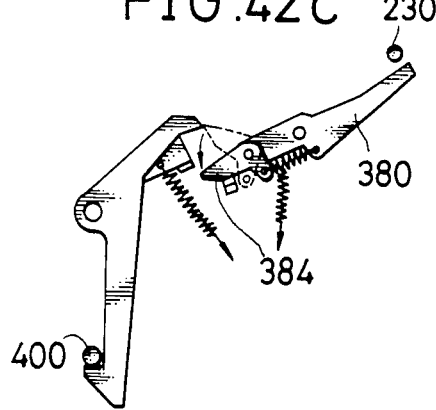
Figure 42D:
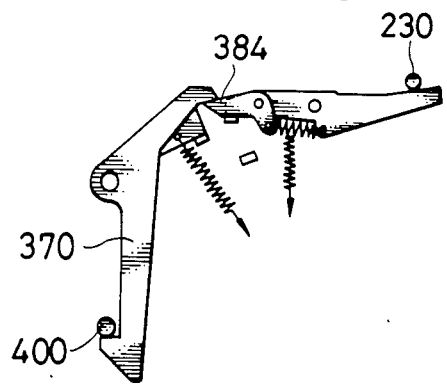

When the slide table is pushed in after either placing a disk on the slide table or taking a disk away, the locking post 400 of the slide table moves while pressing the cam slope 370b, which is located at the tip of the locking lever 370, and is locked by the locking lever 370 as shown in FIG. 42(b).

The operations after the above are completely identical to the operations described in connection with FIGS. 41(b), (c), and (d) so that further explanation will be omitted.

In the example shown in FIG. 42, the holding lever 374 is done away with in order to simplify the mechanism. This contributes markedly toward cost reduction due to a cut in the number of parts used and in the number of assembly steps required.

Similar action and effects can be obtained by employing another embodiment, though the figure is omitted, in which the unlocking lever 380 is pushed by the rack 218 instead of by the crank arm 230. In this case, the rack is lowered together with the turn table, while pressing the crank arm 230 and the unlocking lever 380. The form of the tip of the rack that makes direct contact with the unlocking lever has to be designed in such a way so as to avoid slipping of the unlocking lever 380, even when the rack is lowered for some reason.

As has been described in detail in the foregoing, the present invention contains a mechanism which does not require the lifting/lowering of the lifter, by the slide table and the lifter into one body. With this arrangement, it becomes possible to make the slide table using thin materials since not as much strength is required to protect against a force in the vertical direction. This gain is made by doing away with the large opening in the slide table required previously for letting the lifter pass through and by the unification of the two elements.

In addition, the present invention contains a mechanism in which the disk is clamped between a fixed disk clamper and a turn table whose raising/lowering is achieved by turning a sub-chassis, and in which is incorporated the turn table that can be turned within a small range of angle, by means of a combination of gears, cams, and the like. As a result, a simplification in the mechanism for raising/lowering becomes possible, realizing a reduction in the number of parts required.

Moreover, in accordance with the present invention, it is arranged that, both the loading/unloading drive for the disk and the pick-up head feeding drive, are served commonly by a motor and a speed reduction mechanism for the motor. It is also arranged to do away with the large solenoid required in the prior art apparatus, so that it becomes possible to realize a reduction in the size and the weight, and to effect an improvement in the reliability of the recorded disk playback apparatus.

While the invention has been described in its preferred embodiments, it is to be understood that the words which have been used are words of description rather than limitation and that various changes and modifications may be made within the purview of the appended claims without departing from the true scope and spirit of the invention in its broader aspects.

What is claimed is:

1. A recorded disk reproducing apparatus for reproducing information memorized in a recorded disk by means of a pick-up head, comprising:
   a main chassis housed in a main frame of the recorded disk reproducing apparatus;
   a sub-chassis supported at one end thereof by said main chassis and pivotable around said one end of the sub-chassis;
   a carriage attaching the pick-up head thereto and movable on said sub-chassis for moving the pick-up head in the radial direction of the recorded disk;
   a turn table for putting the recorded disk thereon, said turn table being placed on the sub-chassis and rotated by a turn table motor;
   a disk clamper rotatably disposed above the turn table at a fixed position with respect to said main chassis to hold the disk between the disk clamper and the turn table by the pivotal movement of the sub-chassis;
   a first mechanism which moves the carriage and pivots said sub-chassis around said one end thereof;
   driving means for driving said first mechanism.

2. A recorded disk reproducing apparatus as claimed in claim 1, in which the engagement and disengagement of said disk clamper with respect to the recorded disk placed on said turn table are respectively controlled by the raising and lowering of said sub-chassis around said one end thereof.

3. A recorded disk reproducing apparatus as claimed in claim 1, in which the recorded disk engaged with said turn table is arranged to be clamped between said disk clamper and said turn table at the time when said sub-chassis attains a predetermined raising position around said one end thereof.

4. A recorded disk reproducing apparatus as claimed in claim 2, in which said driving means comprises a driving motor which serves commonly for moving the pick-up head and pivoting said sub-chassis.

5. A recorded disk reproducing apparatus as claimed in claim 4, in which said first mechanism comprises a rack moved in the radial direction of the recorded disk by the driving motor, a stopper defining the moving range of said carriage, a linking mechanism making it possible to link the rack with the carriage within the moving range of said carriage, and a third mechanism for pivoting said sub-chassis around said one end thereof in association with the shifting motion of the rack.

6. A recorded disk reproducing apparatus as claimed in claim 5, in which the linking mechanism is arranged to make the rack alone movable when the motion of said carriage is regulated by the stopper, and to make the linkage between the rack and said cariage possible when the regulation of the stopper on said carriage is released.

7. A recorded disk reproducing apparatus as claimed in claim 6, in which the third mechanism pivots said sub-chassis in association with the shifting motion of the rack when the motion of said carriage is regulated by the stopper.

8. A recorded disk reproducing apparatus as claimed in claim 7, in which said linking mechanism comprises elongated openings disposed in the rack and projections mounted on said carriage so as to be freely movable in the elongated openings of the rack, and the linkage between said carriage and the rack is achieved only when the projections on said carriage directly contact the walls defining the elongated openings of the rack.

9. A recorded disk reproducing apparatus as claimed in claim 7, in which said third mechanism comprises a slit disposed at the front end of said sub-chassis, a metallic crank held pivotally by a bracket fixed to said main chassis, and an elastic component which energizes said sub-chassis for all times so as to pivot it in the direction in which said turn table is to be raised, and one end of the metallic crank is linked to the slit, while the other end of the crank is disposed at a position where it makes a direct contact with the rack, and it is arranged to lower the sub-chassis in association with the shifting motion of the rack alone.

10. A recorded disk reproducing apparatus as claimed in claim 5, further comprising:
    a slide table for transporting the recorded disk to a position in which the center of the disk is aligned with the center of rotation of said turn table; and
    a locking/unlocking mechanism which locks/unlocks said slide table with respect to the main chassis in association with the shifting motion of the rack.

11. A recorded disk reproducing apparatus as claimed in claim 10, in which said locking/unlocking mechanism is equipped with a locking lever which holds the slide table at the housing position of the playback apparatus by linking the locking lever with a locking post disposed on said slide table, an unlock holding lever which holds the locking lever at its released position, an unlocking lever moved by the shifting motion of the rack during the loading/unloading of the disk, and an unlocking ratchet provided at one end of the unlocking lever, while the other end of the unlocking lever is moved by the driving means to cause the unlocking ratchet to integrally move with the unlocking lever and cause the locking lever to move to its unlocking position by the unlocking ratchet, during the loading operation in such a manner that, even when the unlocking lever is moved, it does not affect the locking lever due to the dodging turn of the unlocking ratchet.

12. A recorded disk reproducing apparatus as claimed in claim 11, in which the locking post on a slide table rides across and presses the cam slope disposed at the tip of the locking lever.

13. A recorded disk reproducing apparatus as claimed in claim 10, in which said first mechanism further comprises a control mechanism which controls the operation of the driving motor in accordance with the shifted position of said carriage and the pivotal position of said sub-chassis.

14. A recorded disk reproducing apparatus as claimed in claim 10, further comprising:
    a push-back mechanism for pushing out said slide table at the time time when the locking of said slide table is released.

15. A recorded disk reproducing apparatus as claimed in claim 1 wherein said apparatus further comprises:
    a slide table for transporting the recorded disk to the position in which the center of the disk is aligned with the center of rotation of said turn table;

wherein the engagement/disengagement of said disk clamper with respect to the recorded disk placed on said turntable is controlled by the pivotal movement of said sub-chassis;

said driving means comprising a driving motor to serve commonly for moving the pick-up head and pivoting said sub-chassis by the driving of said first mechanism; and a locking/unlocking mechanism for locking/unlocking said slide table with respect to the main chassis in association with the operation of said first mechanism.

16. A recorded disk playback apparatus as claimed in claim 15, in which said locking/unlocking mechanism is equipped with a locking lever for locking the slide table at its housing position in the playback apparatus by linking the locking lever with the slide table by means of a locking post prepared on the slide table, an unlock holding lever which holds the locking lever at the released position, and an unlocking lever which is moved by the rack that undergoes shifting during the loading/unloading of the disk, and on one end of the locking lever being provided an unlocking ratchet, while the other end of the unlocking lever moves solidly with the unlocking lever due to being pushed by the parts of the driving mechanism, to let the unlocking ratchet shift the locking lever to the unlocking position, in a manner that the locking/unlocking is carried out in such a way that will not affect the locking lever even when the unlocking lever is moved by way of the dodging turn of the unlocking ratchet.

17. A recorded disk reproducing apparatus as claimed in claim 1 wherein said driving means comprises a driving motor which serves commonly for moving the pick-up head and pivoting said sub-chassis, and said first mechanism comprises:

a rack moving in the radial direction of the recorded disk due to said driving motor;

a stopper defining the range of operation of said carriage;

a linking mechanism making possible the linkage between the rack and said carriage within the range of movement of said carriage; and a raising/lowering mechanism pivoting said sub-chassis in association with the shifting operation of the rack.

* * * * *